US012563296B2

(12) United States Patent (10) Patent No.: US 12,563,296 B2
Lee et al. (45) Date of Patent: Feb. 24, 2026

(54) IMAGE STABILIZATION METHOD AND ELECTRONIC DEVICE THEREFOR

(71) Applicant: SAMSUNG ELECTRONICS CO., LTD., Suwon-si (KR)

(72) Inventors: Bohee Lee, Suwon-si (KR); Byungho Ahn, Suwon-si (KR); Jiyoon Park, Suwon-si (KR); Jaehee Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 154 days.

(21) Appl. No.: 18/112,310

(22) Filed: Feb. 21, 2023

(65) Prior Publication Data

US 2023/0209193 A1 Jun. 29, 2023

Related U.S. Application Data

(63) Continuation of application No. PCT/KR2021/010431, filed on Aug. 6, 2021.

(30) Foreign Application Priority Data

Aug. 21, 2020 (KR) ........................ 10-2020-0105606

(51) Int. Cl.
*H04N 23/68* (2023.01)
*H04N 23/61* (2023.01)
*H04N 23/63* (2023.01)

(52) U.S. Cl.
CPC ........... *H04N 23/683* (2023.01); *H04N 23/61* (2023.01); *H04N 23/631* (2023.01); *H04N 23/632* (2023.01); *H04N 23/6842* (2023.01)

(58) Field of Classification Search
CPC ............... H04N 23/683; H04N 23/632; H04N 23/6842; H04N 23/61; H04N 23/631; H04N 23/6815; H04N 23/6812
See application file for complete search history.

(56) References Cited

U.S. PATENT DOCUMENTS 5,724,618 A 3/1998 Miyamoto et al.
9,170,429 B2 10/2015 Shibata
(Continued)

FOREIGN PATENT DOCUMENTS

CN 108141529 A 6/2018
CN 108184048 A 6/2018
(Continued)

OTHER PUBLICATIONS

Communication dated Dec. 20, 2023, issued by the European Patent Office in counterpart European Application No. 21858511.5.
(Continued)

*Primary Examiner* — Nicholas G Giles
(74) *Attorney, Agent, or Firm* — Sughrue Mion, PLLC

(57) ABSTRACT

An electronic device includes: a camera; a display; and at least one processor electrically connected to the camera and the display. The at least one processor is configured to: obtain an image data from the camera; output a preview image of the image data on the display, based on a configured magnification; detect at least one object of the preview image in a state in which the configured magnification is greater than a reference magnification; and perform an image stabilization on the preview image, based on the detected at least one object of the preview image.

12 Claims, 14 Drawing Sheets

(56) References Cited

U.S. PATENT DOCUMENTS

| | | | |
|---|---|---|---|
| 9,633,697 | B2 | 4/2017 | Ubillos |
| 9,860,448 | B2 | 1/2018 | Yoo et al. |
| 9,992,421 | B2 | 6/2018 | Tsubusaki |
| 10,148,881 | B2 | 12/2018 | Beysserie et al. |
| 10,440,277 | B2 | 10/2019 | Hirai et al. |
| 10,554,891 | B2 | 2/2020 | Nadamoto et al. |
| 2013/0329062 | A1 | 12/2013 | Zhou et al. |
| 2014/0300765 | A1 | 10/2014 | Takao et al. |
| 2017/0034410 | A1* | 2/2017 | Yoo ...................... H04N 23/632 |
| 2017/0094184 | A1 | 3/2017 | Gao et al. |
| 2017/0134658 | A1* | 5/2017 | Miyahara ............... H03H 17/04 |
| 2017/0299842 | A1* | 10/2017 | Posa ...................... G02B 23/12 |
| 2018/0167558 | A1 | 6/2018 | Hirai et al. |
| 2019/0089906 | A1 | 3/2019 | Joo et al. |
| 2019/0208126 | A1 | 7/2019 | Wakamatsu |
| 2019/0355108 | A1 | 11/2019 | Chen et al. |
| 2020/0267313 | A1 | 8/2020 | Youn et al. |
| 2021/0136296 | A1 | 5/2021 | Kim et al. |

FOREIGN PATENT DOCUMENTS

| | | | |
|---|---|---|---|
| JP | 2013-104921 | A | 5/2013 |
| JP | 2013-251840 | A | 12/2013 |
| JP | 2014-204342 | A | 10/2014 |
| JP | 2015-37248 | A | 2/2015 |
| JP | 2015-76707 | A | 4/2015 |
| JP | 2017-111430 | A | 6/2017 |
| KR | 10-2021-0118622 | A | 10/2021 |
| KR | 10-2344104 | B1 | 12/2021 |
| KR | 10-2385360 | B1 | 4/2022 |

OTHER PUBLICATIONS

Office Action dated Feb. 4, 2025, issued by European Patent Office in European Patent Application No. 21858511.5.

Office Action dated Feb. 21, 2025, issued by Korean Patent Office in Korean Patent Application No. 10-2020-0105606.

International Search Report (PCT/ISA/210) dated Dec. 3, 2021 issued by the International Searching Authority in International Application No. PCT/KR2021/010431.

Written Opinion (PCT/ISA/237) dated Dec. 3, 2021, issued by the International Searching Authority in International Application No. PCT/KR2021/010431.

Communication issued on Jul. 25, 2025 by the China National Intellectual Property Administration for Chinese Patent Application No. 202180051653.0.

Communication issued on Oct. 28, 2025 by the Korean Ministry of Intellectual Property (MOIP) in Korean Patent Application No. 10-2020-0105606.

* cited by examiner

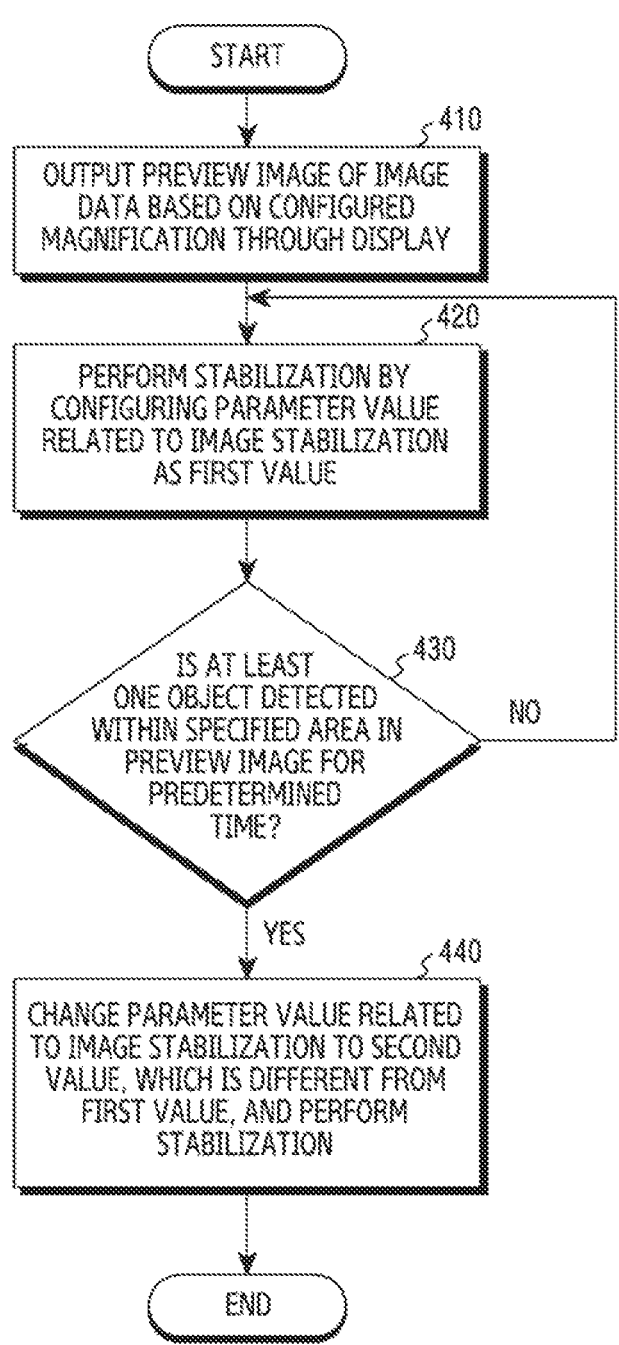

START

410
OUTPUT PREVIEW IMAGE OF IMAGE DATA BASED ON CONFIGURED MAGNIFICATION THROUGH DISPLAY

420
PERFORM STABILIZATION BY CONFIGURING PARAMETER VALUE RELATED TO IMAGE STABILIZATION AS FIRST VALUE

430
IS AT LEAST ONE OBJECT DETECTED WITHIN SPECIFIED AREA IN PREVIEW IMAGE FOR PREDETERMINED TIME?

NO

YES

440
CHANGE PARAMETER VALUE RELATED TO IMAGE STABILIZATION TO SECOND VALUE, WHICH IS DIFFERENT FROM FIRST VALUE, AND PERFORM STABILIZATION

END

FIG.4

IMAGE STABILIZATION METHOD AND ELECTRONIC DEVICE THEREFOR

CROSS-REFERENCE TO RELATED APPLICATIONS

This application is a by-pass continuation application of International Application No. PCT/KR2021/010431, filed on Aug. 6, 2021, which based on and claims priority to Korean Patent Application No. 10-2020-0105606, filed on Aug. 21, 2020, in the Korean Intellectual Property Office, the disclosures of which are incorporated by reference herein in their entireties.

BACKGROUND

1. Field

The disclosure relates to an electronic device for image stabilization during photographing by a camera and a method therefor.

2. Description of Related Art

Image stabilization in camera functions is an essential and important function to obtain clear pictures. In general, image stabilization includes Optical Image Stabilization (OIS) and Digital Image Stabilization (DIS). OIS is a method of reducing shaking by moving a lens or sensor, and DIS is a method of reducing shaking by digital processing, which is, adopted by a portable terminal.

As zoom magnification supported by electronic devices increases, users may magnify a preview screen at a very high magnification. However, in a case where digital zoom is applied to provide a high-magnification image, the electronic device outputs only some of image data obtained by an image sensor as preview data or stores the same as an image file.

As the zoom magnification increases, a motion of a preview image caused by the movement of the mobile phone greatly increases, and in a case where the DIS is performed in high magnification photographing, the image stabilization range is calculated as a size ratio of the preview image and an image data obtained by a camera, so performance of image stabilization eventually deteriorates.

In addition, since the above image stabilization is not intended for stabilization of the image data by distinguishing a slight shake from a fine adjustment by a user, the stabilization may not be performed against the user's intention or may be performed with an unwanted stabilization strength. For example, the image stabilization may not be applied to the motion of an image caused by a user who is intentionally moving the electronic device to change a Field Of View (FOV).

One or more embodiments of the disclosure may provide an electronic device that performs image stabilization against an unintentional shake of the user during photographing an image in a high-magnification mode, thereby stably capturing the image. One or more embodiments of the disclosure may also provide a method performed by the electronic device.

Technical problems to be solved in the disclosure are not limited to the technical problems mentioned above, and other technical problems not mentioned will be clearly understood by those skilled in the art to which the disclosure belongs from the description below.

SUMMARY

According to an aspect of the disclosure, an electronic device includes: a camera; a display; and at least one processor electrically connected to the camera and the display. The at least one processor is configured to: obtain an image data from the camera; output a preview image of the image data on the display, based on a configured magnification; detect at least one object of the preview image in a state in which the configured magnification is greater than a reference magnification; and perform an image stabilization on the preview image, based on the detected at least one object of the preview image.

According to another aspect of the disclosure, a method of operating an electronic device, includes: obtaining an image data from a camera; outputting a preview image of the image data on a display, based on a configured magnification; detecting at least one object of the preview image obtained by the camera in a state in which the configured magnification is greater than a reference magnification; and performing an image stabilization on the preview image, based on the detected at least one object of the preview image.

According to another aspect of the disclosure, an electronic device includes: a camera; a display; and at least one processor electrically connected to the camera and the display. The at least one processor is configured to: output a preview image of an image data, based on a configured magnification, on the display; perform an image stabilization by configuring a parameter value as a first value; determine whether an object is detected within a specified area of the preview image for a predetermined time; and change the parameter value to a second value, based on a determination that the object is detected within the specified area of the preview image for the predetermined time and perform the image stabilization by configuring the parameter value as the second value. The second value is different from the first value.

According to one or more embodiments of the disclosure, an image stabilization function may be automatically provided as an object to be photographed is recognized.

In addition, according to one or more embodiments, it may be possible to provide a user with an image that is not shaken in a high-magnification photographing environment. In addition, various effects identified directly or indirectly through the disclosure may be provided.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates an operation of changing a parameter value related to image stabilization according to whether object detection satisfies predetermined conditions in an electronic device In an embodiment;

DETAILED DESCRIPTION

Hereinafter, one or more embodiments of this document will be described with reference to the accompanying drawings. However, this is not intended to limit this document to specific embodiments and should be understood to encompass various modifications, equivalents, and/or alternatives to the embodiments of the disclosure.

Figure 1:
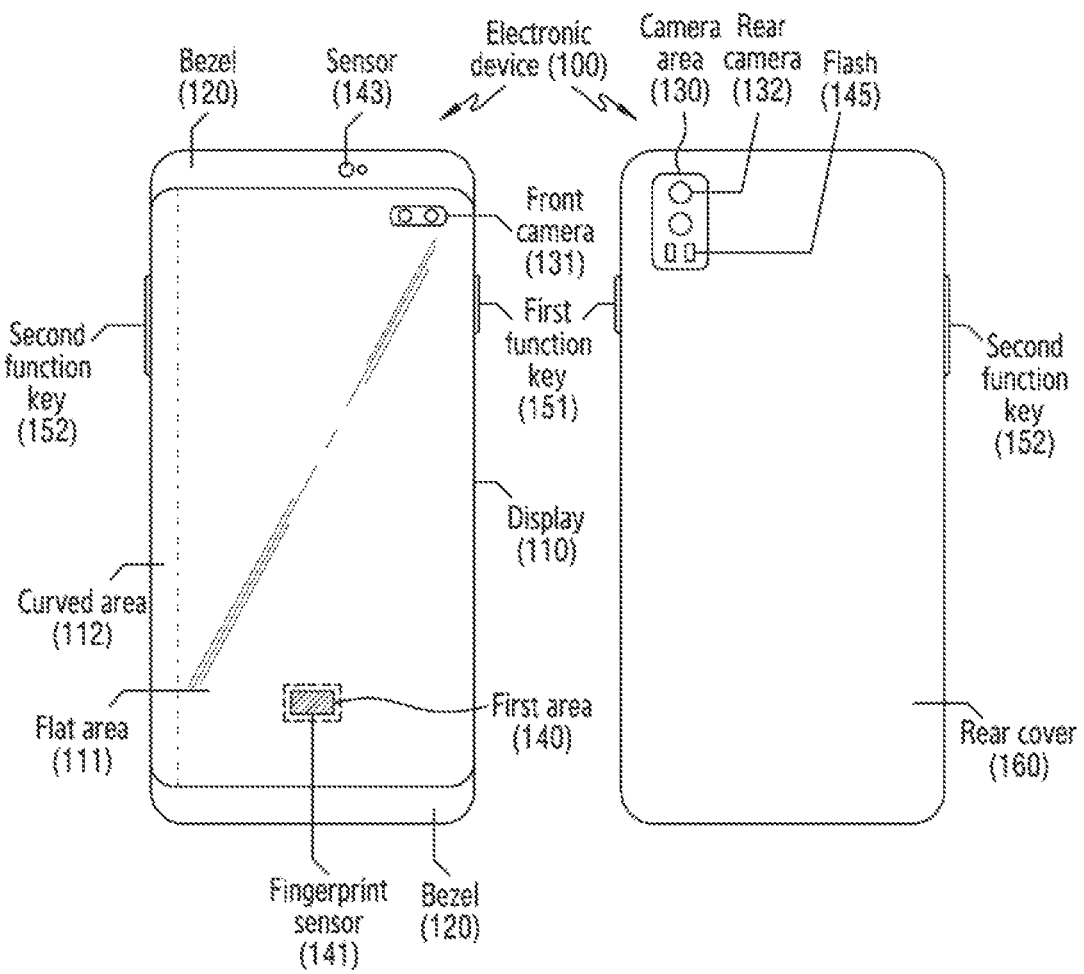
FIG. 1 illustrates an electronic device In an embodiment.

FIG. 1 shows an electronic device. In FIG. 1, a display 110 may be disposed on a front surface of an electronic device 100 (e.g., the electronic device 1301 in FIG. 13). In an embodiment, the display 110 may occupy a majority of the front surface of the electronic device 100. The display 110 and a bezel 120 surrounding at least some edges of the display 110 may be disposed on the front surface of the electronic device 100.

In FIG. 1, the display 110 may include a flat area 111 and a curved area 112 extending from the flat area 111 toward the side of the electronic device 100. Although the curved area 112 is shown only on one side (e.g., the left side) in FIG. 1, the curved area is formed on the opposite side as well. In addition, the electronic device 100 illustrated in FIG. 1 is only an example, and one or more embodiments are possible. For example, the display 110 of the electronic device 100 may include only the flat area 111 without the curved area 112 or may include the curved area 112 only on one edge, instead of both edges. In addition, in an embodiment, the curved area may extend to the rear surface of the electronic device 100 so that the electronic device 100 may include an additional flat area.

In an embodiment, a fingerprint sensor 141 for recognizing a user's fingerprint may be included in a first area 140 of the display 110. The fingerprint sensor 141 may be disposed under the display 110 so as to be invisible or hardly visible to the user. In addition to the fingerprint sensor 141, a sensor for additional user/biometric authentication may be disposed in a partial area of the display 110. In another embodiment, a sensor for user/biometric authentication may be disposed in one area of the bezel 120. For example, an IR sensor for iris authentication may be exposed through one area of the display 110 or through one area of the bezel 120.

In an embodiment, a sensor 143 may be included in at least one area of the bezel 120 or at least one area of the display 110 of the electronic device 100. The sensor 143 may be a sensor for distance detection and/or a sensor for object detection. The sensor 143 may be disposed at a short distance from a camera module (e.g., a front camera 131 and a rear camera 132) or may be formed as one module with the camera module. For example, the sensor 143 may operate as at least a part of an infrared (IR) camera (e.g., a Time-Of-Flight (TOF) camera or a structured light camera) or operate as at least a part of a sensor module (e.g., the sensor module 1376 in FIG. 13).

In an embodiment, a front camera 131 may be disposed on the front surface of the electronic device 100. Although it is illustrated the front camera 131 is exposed through one area of the display 110 in the embodiment of FIG. 1, in another embodiment, the front camera 131 may be exposed through the bezel 120.

Figure 13:
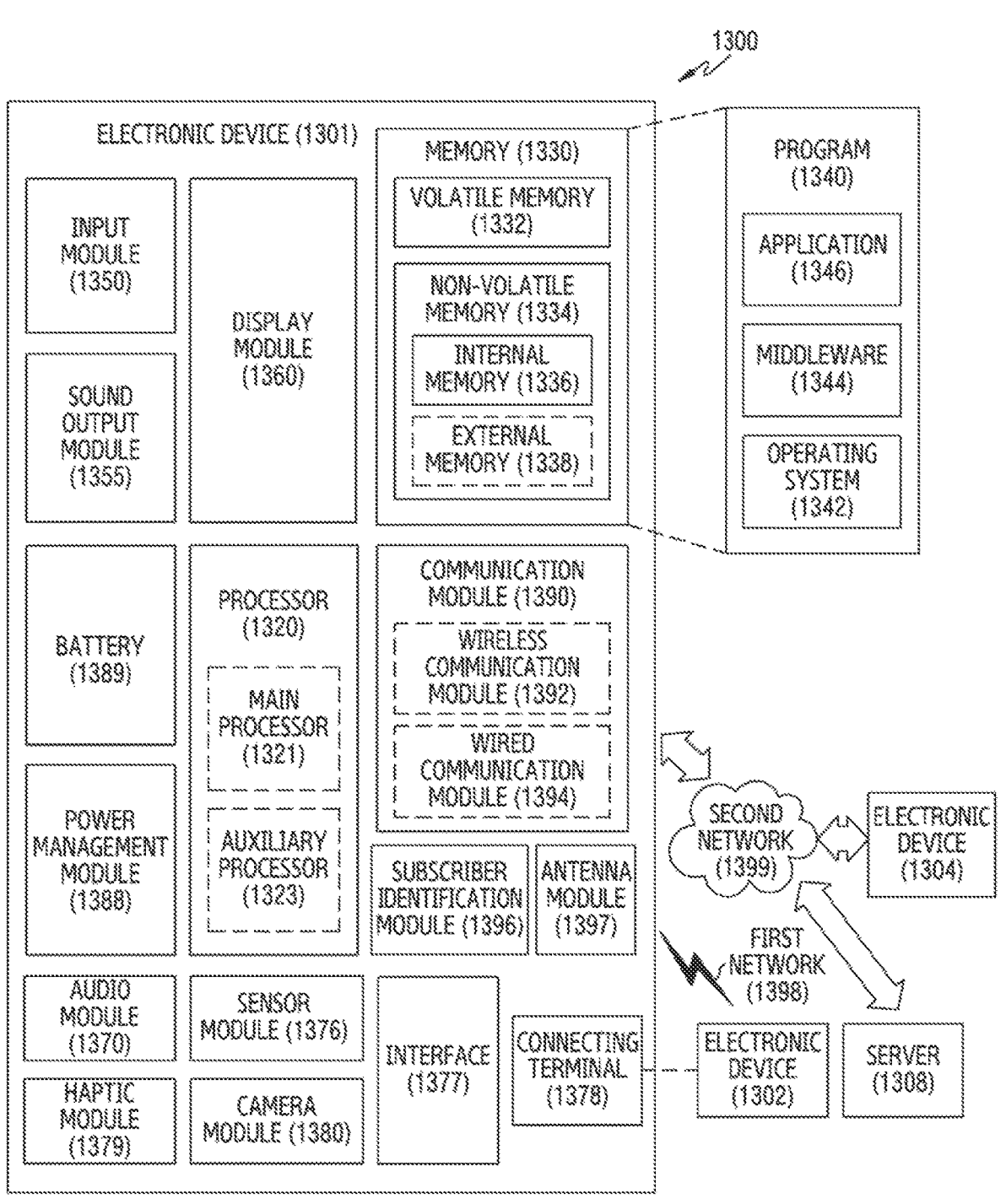
FIG. 13 illustrates an electronic device in a network environment according to one or more embodiments.

In an embodiment, the display 110 may include at least one or more of a sensor module (e.g., the sensor module 1376 in FIG. 13), a camera module (e.g., a front camera 131, a rear camera 132, or a camera module 1380 in FIG. 13), and a light-emitting device (e.g., an LED) on the rear surface of a screen display area (e.g., the flat area 111 or the curved area 112).

In an embodiment, a camera module may be disposed on the rear surface of at least one of the front surface, side surface, and/or rear surface of the electronic device 100 so as to face the front surface, the side surface, and/or the rear surface. For example, the front camera 131 may be an Under-Display Camera (UDC) that is not visually exposed to the screen display area (e.g., the flat area 111 or the curved area 112). In an embodiment, the electronic device 100 may include one or more front cameras 131. For example, the electronic device 100 may include two front cameras such as a first front camera and a second front camera. In an embodiment, the first front camera and the second front camera may be cameras of the same type having the same specification (e.g., pixels), but the first front camera and the second front camera may be implemented as cameras having different specifications. The electronic device 100 may support functions related to a dual-camera (e.g., 3D photographing, auto-focus (AF), etc.) through two front cameras.

In an embodiment, a rear camera 132 may be disposed on the rear surface of the electronic device 100. The rear camera 132 may be exposed through a camera area 130 of a rear cover 160. In an embodiment, the electronic device 100 may include multiple rear cameras disposed in the camera area 130. For example, the electronic device 100 may include two or more rear cameras. For example, the electronic device 100 may include a first rear camera, a second rear camera, and a third rear camera.

The first rear camera, the second rear camera, and the third rear camera may have different specifications. For example, the first rear camera, the second rear camera, and/or the third rear camera may be different from each other in Field Of View (FOV), pixels, apertures, supporting optical zoom/digital zoom or not, supporting an image stabilization function or not, the type of set of lenses included in each camera, and/or arrangement thereof. For example, the first rear camera may be a general camera, the second rear camera may be a camera (wide-angle camera) for wide angle photographing, and the third rear camera may be a telephoto camera. In the embodiments of this document, descriptions of functions or characteristics of the front camera may be applied to the rear camera, and vice versa.

In an embodiment, various types of hardware or sensors assisting photographing, such as a flash 145, may be further disposed in the camera area 130. For example, various sensors such as a distance sensor for detecting a distance between a subject and the electronic device 100 may be further included.

In an embodiment, the distance sensor may be disposed at a short distance from the camera module (e.g., the front camera 131 or the rear camera 132) or formed as a single module with the camera module. For example, the distance sensor may operate as at least a part of an infrared (IR) camera (e.g., a TOF camera or a structured light camera) or operate as at least a part of a sensor module (e.g., the sensor module 1376 in FIG. 13). For example, the TOF camera may operate as at least a part of a sensor module (e.g., the sensor module 1376 in FIG. 13) for detecting a distance to a subject.

In an embodiment, at least one physical key may be disposed on the side part of the electronic device 100. For example, a first function key 151 for turning on/off the display 110 or turning on/off the electronic device 100 may be disposed on the right edge of the electronic device 100, based on the front surface thereof. In an embodiment, a second function key 152 for controlling the volume or screen brightness of the electronic device 100 may be disposed on the left edge of the electronic device 100, based on the front surface thereof. In addition to this, additional buttons or keys may be disposed on the front or rear surface of the electronic device 100. For example, a physical button or a touch button mapped to a specific function may be disposed in a lower area of the bezel 120.

The electronic device 100 illustrated in FIG. 1 is only an example and is not intended to limit the shape of the device to which the technical concept disclosed in this document is applied. For example, the technical idea disclosed in this document may be applied to a foldable electronic device capable of being folded horizontally or vertically by employing the display 110 and a hinge structure, or a tablet or laptop computer. In addition, although the electronic device 100 of the illustrated example shows a bar-type or plate-type appearance, one or more embodiments of this document are not limited thereto. For example, the illustrated electronic device may be a part of a rollable electronic device. The "rollable electronic device" may indicate that the display 110 is able to be bent and deformed so that at least a portion thereof may be wound or rolled, or received inside the electronic device 100. The rollable electronic device may enable the display 110 to be unfolded or may expose a larger area of the display 110 to the outside according to the user's needs, so that the screen display area (e.g., the flat area 111 and the curved area 112) may be extended and used. The display 110 may be referred to as a slide-out display or an expandable display. Hereinafter, one or more embodiments will be described based on the electronic device 100 shown in FIG. 1.

Figure 2:
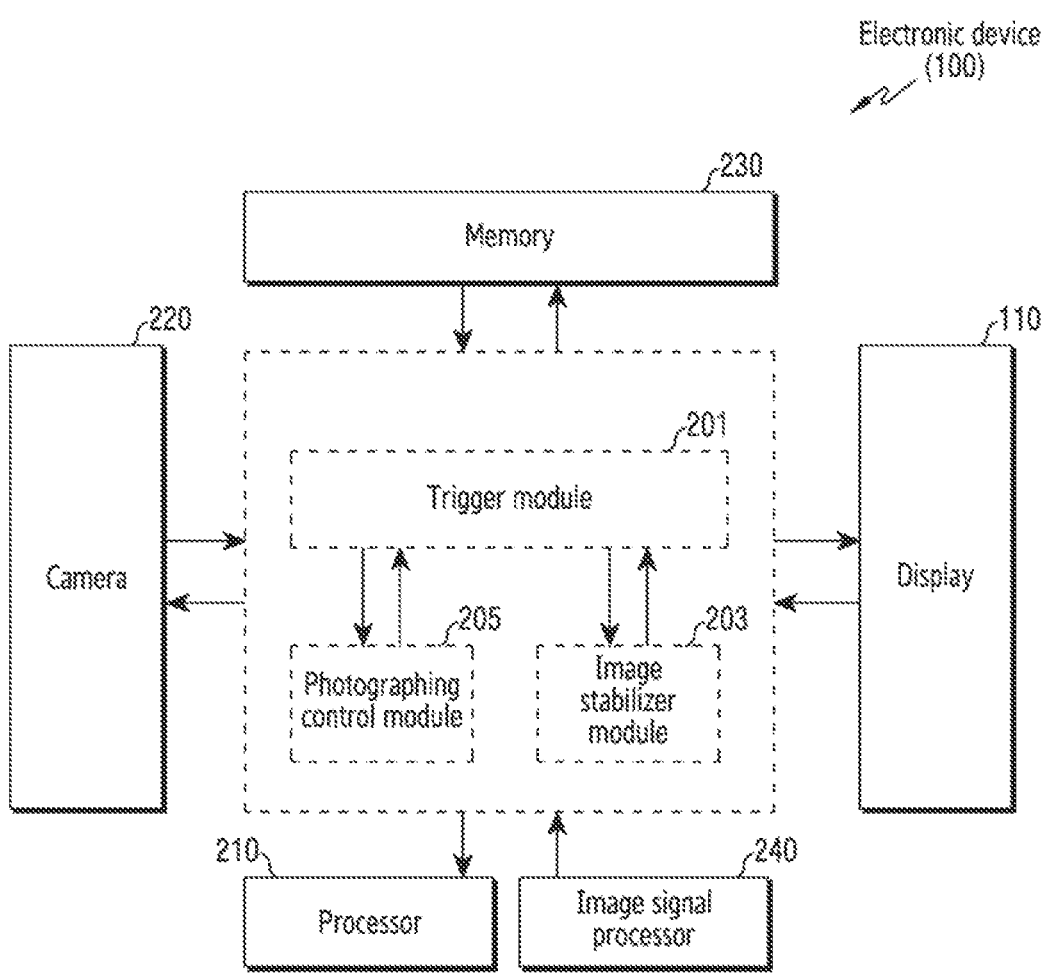
FIG. 2 illustrates an operation of performing image stabilization in an electronic device In an embodiment.

FIG. 2 illustrates an operation of performing image stabilization in an electronic device. In the description of FIG. 2, the configurations and/or functions described in FIG. 1 may be briefly described, or descriptions thereof may be omitted.

In FIG. 2, the electronic device 100 may use a hardware and/or software module to support functions for performing stabilization of an image. For example, a processor 210 (e.g., the processor 1320 in FIG. 13) may drive a trigger module 201, an image stabilizer module 203, and a photographing control module 205 by executing instructions stored in a memory 230 (e.g., the memory 1330 in FIG. 13).

In one or more embodiments, software modules other than those shown in FIG. 2 may be implemented. For example, at least two modules may be integrated into one module, or one module may be divided into two or more modules. In addition, the hardware and software modules may share a single function, thereby improving work performance. For example, the electronic device 100 may include both an encoder implemented as hardware and an encoder implemented as a software module so that some of data obtained by at least one camera module may be processed in the hardware encoder and the remaining data may be processed in the software encoder.

In an embodiment, the trigger module 201 may generate a trigger signal through a user's input and/or an object detection. The trigger module 201 may provide the generated trigger signal to the image stabilizer module 203. The trigger signal may include a first trigger event and a second trigger event. The first trigger event may be a trigger event for increasing the strength of image stabilization. The second trigger event may be a trigger event for reducing the strength of image stabilization. The first trigger event may be mentioned or referred to as a 'lock' trigger. The second trigger event may be mentioned or referred to as an 'unlock' trigger.

In an embodiment, the user's input may include at least a user's input through a display touch and/or a user's input through a button input. The button input may include a physical button and/or a virtual button. The display touch input may share an AF signal. For example, the display touch input may include a user's touch input to the AF produced according to the execution of the AF.

In an embodiment, the object detection may include detecting an object through an analysis of image data obtained by a camera 220 (e.g., the camera module 1380 in FIG. 13). For example, the object detection may include a natural object (e.g., moon and sun) detection, a face detection, a body detection, and a gesture detection. The object detection may include simply detecting a basic shape of a natural object and detecting modified shapes of the basic shape of the natural object. For example, the object detection may include detecting various types of moons, such as a crescent moon and a waxing moon, as well as a full moon.

In an embodiment, the object detection may include detecting at least one object by using various detection methods. The trigger module 201 may detect an object using Artificial Intelligence (AI) such as machine learning. For example, the object detection may include detection of an object by using a division technique (e.g., segmentation) and/or an edge detection method. The edge detection method may detect an object using a difference in a color value between pixels. The various detection methods are not limited to the above-mentioned division technique and edge detection method and may include various methods previously disclosed.

In an embodiment, if a specific gesture is detected, the trigger module 201 may transmit information about the specific gesture to the photographing control module 205.

In an embodiment, the image stabilizer module 203 may calculate the movement of an electronic device through a motion sensor included in the electronic device 100. The image stabilizer module 203 may calculate the position (e.g., the current position) of the electronic device 100 and/or the position at the time at which a trigger occurs in order to lock up a FOV at the trigger occurrence time.

The image stabilizer module 203 may obtain a trigger signal transmitted from the trigger module 201 and adjust the strength of image stabilization. For example, if a lock trigger event occurs, the image stabilizer module 203 may increase the strength of image stabilization, based on the position of the electronic device 100 at the time that the lock trigger occurs. In contrast, when an unlock trigger event occurs, the image stabilizer module 203 may reduce the strength of image stabilization.

In an embodiment, the motion sensor may include an accelerometer sensor, a gyro sensor (gyroscope), a magnetic sensor, or a Hall sensor. However, these sensors are exemplary, and the motion sensor may further include at least one other type of sensor.

In an embodiment, the acceleration sensor is a sensor configured to measure the acceleration acting in three axes (e.g., the X-axis, the Y-axis, or the Z-axis) of the electronic device 100 and may measure, estimate, and/or detect the force applied to the electronic device 100 using the measured acceleration.

In an embodiment, the gyro sensor is configured to measure the angular velocity acting in the three axes of the electronic device 100 and may measure and/or detect the amount of rotation of the electronic device 100 with respect to each axis using angular velocity information measured in each axis.

In an embodiment, the magnetic (geomagnetic or geomagnetic field) sensor and the Hall sensor may include a transmitter for generating a magnetic field of a specific frequency and a receiver for receiving the magnetic field generated by the transmitter. Those sensors may obtain the movement direction and/or movement distance of the electronic device 100. The magnetic (geomagnetic) sensor may measure a bearing using the magnetic field and magnetic force lines.

The Hall sensor may detect the strength of magnetic field to identify the movement of the electronic device 100. The Hall sensor may be configured as at least a part of the camera 220 (e.g., the camera module 1380 in FIG. 14), thereby performing a function of an image stabilizer (e.g., the image stabilizer 1440 in FIG. 14). For example, the camera 220 may perform an image stabilization function using a coil and/or a magnet of the image stabilizer (e.g., the image stabilizer 1440 in FIG. 14) and identify the positional displacement of the magnet, based on a change in the magnetic field identified through the Hall sensor.

In an embodiment, the photographing control module 205 may provide the user with a user interface (UI)/graphical UI (GUI) related to the camera on the display 110. In addition, the photographing control module 205 may control a photographing operation in response to a user's input provided through a UI/GUI output to the display 110.

For example, the photographing control module 205 may obtain a recording start/stop input from the user and transmit the obtained recording start/stop input to the encoder. The input obtained from the user may include an input obtained via a voice recognition function or detection of a specific gesture. For example, if the processor 210 recognizes voices such as "capture", "shoot", and "stop shooting," it may start/stop photographing in response thereto. Alternatively, if the processor 210 detects a gesture of showing a palm, it may start/stop photographing in response thereto.

In an embodiment, the display 110 may include an execution screen of an application executed by the processor 210 or content such as images and/or videos stored in the memory 230. In addition, the processor 210 may display image data obtained by the camera 220 on the display 110 in real time. The display 110 may output a preview area, as a preview image, cropped and/or resized to conform to the resolution of the current preview image.

In an embodiment, an image signal processor 240 (e.g., the image signal processor 1460 in FIG. 14) may perform a stabilization operation on images obtained from by camera 220. In an embodiment, the stabilization operation may include at least one of Auto-Exposure (AE), AF, and Auto-White Balance (AWB). In addition, the image signal processor 240 may improve a quality of the obtained image or apply a desired effect thereto through an appropriate resolution adjustment/tuning operation in addition to the AE, the AF, and/or the AWB.

In an embodiment of FIG. 2, functions performed by the trigger module 201, the image stabilizer module 203, and the photographing control module 205 may be performed by the processor 210 executing instructions stored in the memory 230. In addition, in one or more embodiments, the electronic device 100 may use one or more hardware processing circuits in order to perform various functions and operations disclosed in this document.

For example, an Application Processor (AP) included in a mobile device, an Image Signaling Processor (ISP) mounted to a camera module, a Display Driver Integrated Circuit (DDIC), a touch IC, a Communication Processor (CP), a hardware encoder, or the like may be used for the implementation of the one or more embodiments disclosed in this document. In addition, the connection between the hardware/software shown in FIG. 2 is provided, but does not limit the flow/direction of data or instructions. The elements included in the electronic device 100 may have various electrical/operative connection relationships.

Figure 3:
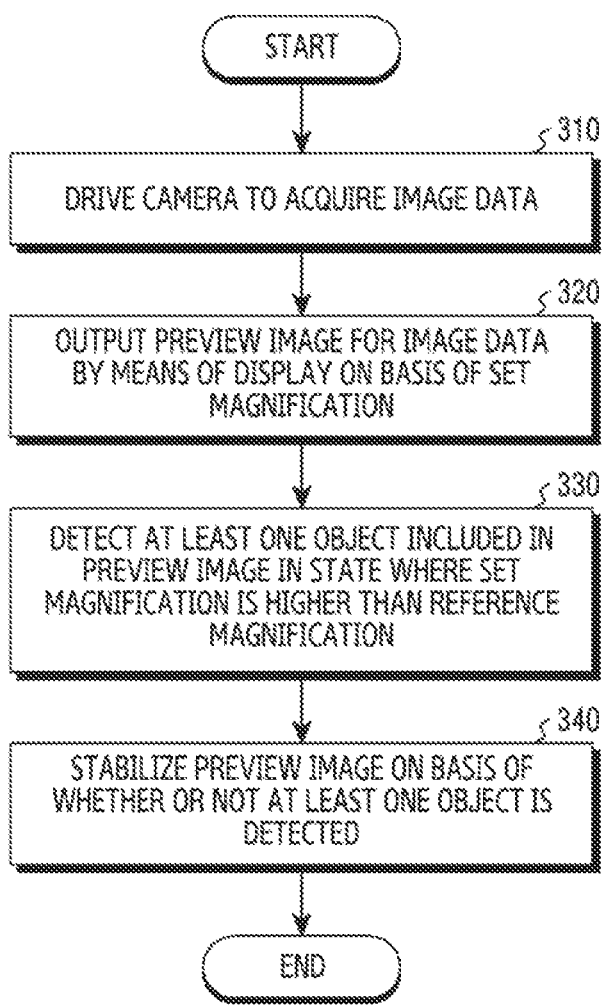
FIG. 3 illustrates an operation of performing image stabilization according to whether an object is detected in an electronic device In an embodiment.

FIG. 3 illustrates an operation of performing image stabilization according to whether an object is detected in an electronic device. The embodiments described in FIG. 3 and drawings subsequent thereto may be applied to capture moving images, as well as to capture still images. In the following embodiments, respective operations may be performed sequentially, but not necessarily sequentially. For example, the sequence of the respective operations may vary, and at least two operations may be performed in parallel.

An operational entity of the flowchart shown in FIG. 3 may be a processor (e.g., the processor 210 in FIG. 2) or an image signal processor (e.g., the image signal processor 240 in FIG. 2). In operation 310, according to an embodiment, the processor 210 may obtain image data from the camera 220.

In an embodiment, the processor 210 may execute a camera application. For example, the processor 210 may obtain a user's input for executing a camera application. The user's input may include at least one of touching an icon of the camera application, clicking on a first function key 151 or a second function key 152, or inputting a voice such as "OOO, turn on the camera" or "OOO, execute the camera" through AI voice recognition. The processor 210 may execute the camera application in response to at least one of the user's inputs.

In an embodiment, the processor 210 may execute the camera application to drive the camera 220. The processor 210 may drive the camera 220 to obtain image data through an image sensor (e.g., the image sensor 1430 in FIG. 14) in the camera 220. The image data may obtain various color values through a color filter array. The color filter array may include an RGB color filter array. The RGB is only an example, and the color filter array may include a color filter array of a Red, Green, Blue, and Emerald (RGBE) pattern, a Cyan, Yellow, And Magenta (CYYM) pattern, a Cyan, Yellow, Green, And Magenta (CYGM) pattern, or a Red, Green, Blue, and White (RGBW) pattern.

In operation 320, in an embodiment, the processor 210 may output a preview image for the image data, based on a configured magnification, on the display 110. Outputting the preview image, based on the configured magnification, may be mentioned or referred to as a 'first mode.' In other words, the first mode may be a mode in which the image processing is performed with a basic value before a strength of image stabilization is increased or decreased.

In an embodiment, the processor 210 may display the preview image on the display, based on a reference magnification (e.g., ×1.0 time). For example, if the camera application is executed, the processor 210 may display the preview image on at least a portion of the display 110, based on the reference magnification (e.g., ×1.0 time).

In an embodiment, the processor 210 may crop some of the obtained image data, thereby determining the area to be output as the preview image. In response to a zoom input (e.g., ×1.5 times) from the user, the processor 210 may crop the image data corresponding to the zoom input, thereby determining the area to be output as the preview image. The processor 210 may upsize the determined area and output the same (the upsized area) as the preview image on the display 110.

In operation 330, in an embodiment, the processor 210 may detect at least one object included in the preview image in a state in which the configured magnification is greater than the reference magnification. Here, the magnification that is greater than the reference magnification may be a high magnification (e.g., ×5.0 times or more) and/or an ultra-high magnification (e.g. ×50.0 times or more). Here, detecting the object may include selecting an object shown in the preview image by the user, as well as detecting the object by the processor 210 by using an object detection function and analyzing the image data.

In an embodiment, the processor 210 may detect at least one object through the camera 220. The processor 210 may analyze the image data obtained by the camera 220, thereby detecting at least one object by using the object detection function. The object detection may include detecting an object by the division technique (e.g., segmentation) and/or the edge detection method.

Alternatively, the processor 210 may determine an object, based on data obtained via machine learning and/or deep learning. For example, the processor 210 may detect a crescent moon in the dark night sky through a function (e.g., a scene optimizer) of the electronic device 100. In a case of photographing the dark night sky, the processor 210 may determine an object (e.g., the moon) in consideration of the average shape of the object (e.g., the moon), the average color of the object (e.g., the moon), or the like.

In an embodiment, the processor 210 may detect an object in response to a user's input of selecting the object displayed in the preview image. The user's input may be a user's input through at least a touch on the display. The processor 210 may display the AF on the object displayed in the preview image and, in response to a user's input of selecting the AF, detect the object.

In operation 340, in an embodiment, the processor 210 may stabilize the preview image, based on whether at least one object is detected. The processor 210 may control the strength of image stabilization in response to a detection of at least one object. For example, if at least one object is detected, the processor 210 may increase the strength of image stabilization, for example, in order to stably photograph or capture the detected object. The state in which the strength of image stabilization is increased may be mentioned or referred to as a 'second mode' in this document. In other words, the second mode may be a mode in which image processing is performed by increasing the strength of image stabilization in response to detection of the object.

In an embodiment, if the object fails to be detected from the preview image in the state in which the configured magnification is greater than the reference magnification, the processor 210 may operate in the 'first mode.'

FIG. 4 illustrates an operation of changing a parameter value related to an image stabilization according to whether object detection satisfies predetermined conditions in an electronic device. In the following embodiment, respective operations may be performed sequentially, but not necessarily sequentially. For example, the sequence of the respective operations may vary, and at least two operations may be performed in parallel. An operational entity of the flowchart shown in FIG. 4 may be a processor (e.g., the processor 210 in FIG. 2) or an image signal processor (e.g., the image signal processor 240 in FIG. 2).

In operation 410, in an embodiment, the processor 210 may output a preview image of an image data, based on a configured magnification, on the display 110. Operation 410 may correspond to operation 320 in FIG. 3.

In operation 420, in an embodiment, the processor 210 may perform a stabilization by configuring a parameter value related to an image stabilization as a first value. The processor 210 may perform the stabilization while maintaining the parameter value related to the image stabilization at a default value in a normal photographing mode.

In operation 430, in an embodiment, the processor 210 may determine whether at least one object is detected within a specified area of the preview image for a predetermined time. For example, the processor 210 may identify whether certain conditions are satisfied in order to determine whether the user has an intention of photographing the object detected in the preview image. For example, if the object is continuously detected during N frames, the processor 210 may change the parameter related to the image stabilization and output a stable preview image. As another example, if the object is not continuously detected during N frames, the processor 210 may not change the parameter related to the image stabilization. For example, the predetermined time may be calculated in units of frames or units of seconds.

In an embodiment, the processor 210 may determine whether the detected object is detected within a specified area, based on a central point of the detected object. For example, the processor 210 may determine whether the central point of the detected object falls within a certain ratio (e.g., 50%) of the preview image. The processor 210 may perform operation 440 if at least one object is detected within the specified area in the preview image for a predetermined time but, otherwise, perform operation 420.

In operation 440, in an embodiment, the processor 210 may change the parameter value related to image stabilization to a second value, which is different from the first value, and then perform a stabilization. The second value may be greater than the first value. For example, the processor 210 may minimize noise corresponding to shaking by increasing the coefficient of a low-pass filter. The low-pass filter may be disposed in a path through which the processor 210 obtains the image data from the image sensor of the camera 220.

Figure 5:
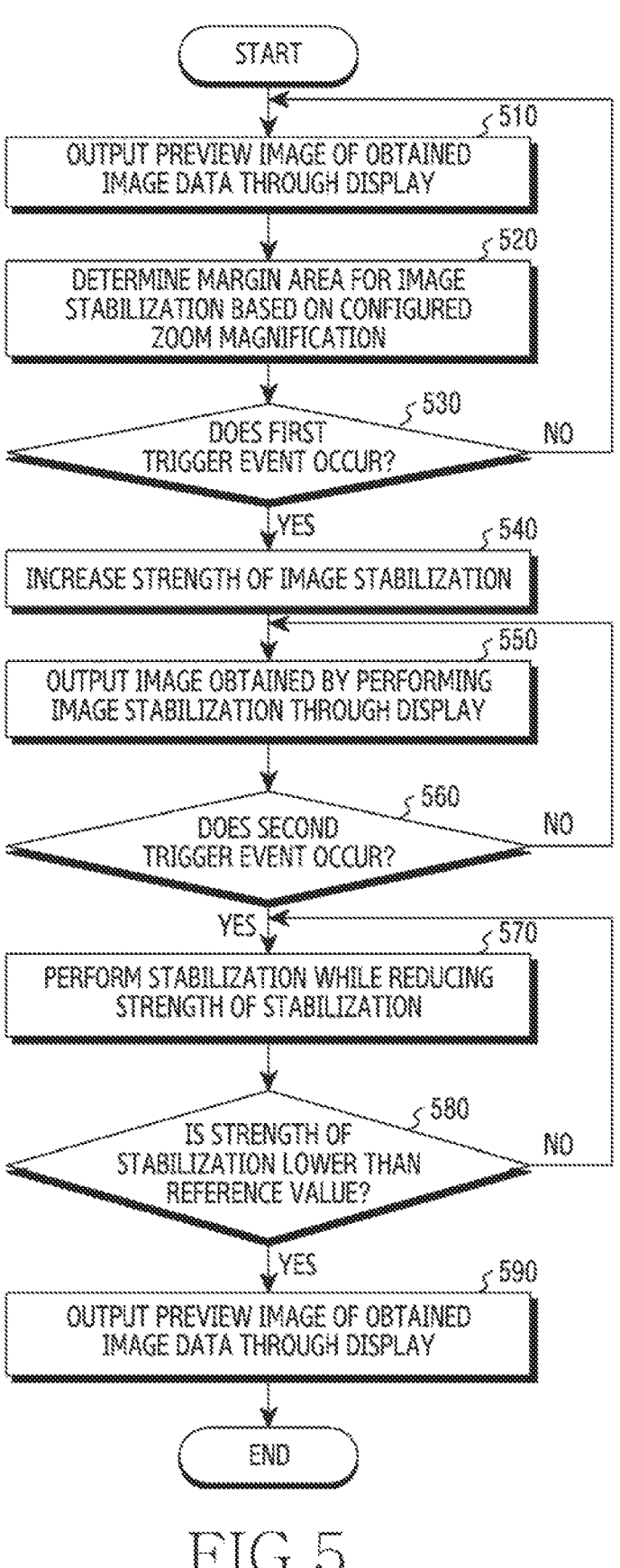
FIG. 5 illustrates an operation of adjusting strength of image stabilization according to whether a trigger event related to image stabilization occurs in an electronic device In an embodiment.

FIG. 5 illustrates an operation of adjusting the strength of image stabilization according to whether a trigger event related to image stabilization occurs in an electronic device. In the following embodiment, respective operations may be performed sequentially, but not necessarily sequentially. For example, the sequence of the respective operations may vary, and at least two operations may be performed in parallel. An operational entity of the flowchart shown in FIG. 5 may be a processor (e.g., the processor 210 in FIG. 2) or an image signal processor (e.g., the image signal processor 240 in FIG. 2).

In operation 510, in an embodiment, the processor 210 may output a preview image of the obtained image data on the display 110. This may correspond to operation 320 in FIG. 3.

In operation 520, in an embodiment, the processor 210 may determine a margin area for image stabilization, based on an obtained zoom magnification. The margin area may be a difference between an input image obtained by the camera 220 and an output image to be output as the preview image. The margin area will be further described with reference to FIG. 9 below.

In operation 530, in an embodiment, the processor 210 may determine whether a first trigger event occurs. The first trigger may be mentioned or referred to as a 'zoom lock trigger' or a 'FOV locking up trigger.' The zoom lock trigger may indicate an event causing the electronic device 100 to perform the image stabilization function in order to stabilize the field of view of an output image.

In an embodiment, the zoom lock trigger may include at least one of a user's display touch input, a user's button input, a user's voice input, or object detection. The user's display touch input may include a case in which the user touches an object that the user wishes to photograph. Touching the object to be photographed may be used in common with the AF function. For example, touching the object may include a user's input of touching the AF in a case where the AF for the object is displayed. The user's voice input may include inputting a voice such as "OOO, do not move the camera" or "OOO, increase camera shaking strength," for example, through AI voice recognition.

In an embodiment, the zoom lock trigger may be performed based on a change in a state (e.g., an unfolded state or an extended state) of the electronic device 100. For example, based on a change in which the display 110 (e.g., the flexible display) is unfolded or extended, the electronic device 100 may display a preview image corresponding to a zoom lock trigger, a user interface (e.g., the user interface 1210 in FIG. 12) showing an area cropped from raw image data, and/or a highlight (e.g., the highlight 1220 in FIG. 12) in the extended display area (e.g., a screen display area).

In an embodiment, the processor 210 may perform operation 540 if the first trigger event occurs but, otherwise, perform operation 510. In an embodiment, the zoom lock trigger may include detecting an object (e.g., the moon) to be photographed.

In operation 540, in an embodiment, the processor 210 may increase the strength of image stabilization. The processor 210 may increase the strength of image stabilization in response to the occurrence of the first trigger event.

In operation 550, in an embodiment, the processor 210 may output an image obtained by performing image stabilization on the display 110. The processor 210 may perform stabilization, based on the strength of image stabilization increased in operation 540. The processor 210 may output a preview image resulting from the image stabilization on the display 110.

In operation 560, in an embodiment, the processor 210 may determine whether a second trigger event occurs. The second trigger may be mentioned or referred to as a 'zoom unlock trigger' or a 'FOV moving trigger.' The zoom unlock trigger may indicate an event causing the electronic device 100 to stop the image stabilization function or reduce the strength of the image stabilization function, so that the FOV of an output image moves (is not locked up).

In an embodiment, the zoom unlock trigger may include a display touch input and a button input by the user in the second mode in which zooming is locked. If an input of touching an object being photographed and/or a button input (e.g., a zoom unlock button) is obtained in the second mode in which zooming is locked, the processor 210 may recognize the same as a zoom unlock trigger.

In an embodiment, the zoom unlock trigger may include a case where the object (that was detected in a previous time instance) is no longer detected in the second mode in which zooming is locked. For example, if the object being detected falls outside of the preview image, the processor 210 may recognize this as a zoom unlock trigger. If the image data obtained by the camera 220 is analyzed and if the object of the image data is not detected from the image data, the processor 210 may this as a zoom unlock trigger.

In an embodiment, the zoom unlock trigger may include a case in which there is no more stabilization margin to be stabilized in the second mode in which zooming is locked. In other words, the zoom unlock trigger may include a case in which a preview image of the current frame falls outside of the margin area determined at a time at which the first trigger event occurs.

In an embodiment, the zoom unlock trigger may be performed based on a change in a state (e.g., a folded state or a reduced state) of the electronic device 100. For example, based on a change in which the display 110 (e.g., the flexible display) is folded or reduced, the electronic device 100 may display a preview image corresponding to a zoom unlock trigger and/or a user interface (e.g., the user interface 1210 in FIG. 12) showing an area cropped from raw image data in the reduced display area (e.g., a screen display area).

In an embodiment, the zoom unlock trigger may include a case in which the processor 210 analyzes a movement of the electronic device 100 and detects the movement greater than or equal to a threshold speed in the second mode in which zooming is locked. A description related to this will be further made with reference to FIG. 10.

In an embodiment, the processor 210 may perform operation 570 if a second trigger event occurs but, otherwise, perform operation 550. In operation 570, in an embodiment, the processor 210 may perform stabilization while reducing the strength of stabilization. The processor 210 may gradually reduce the strength of stabilization. For example, the processor 210 may reduce to a reference value during a first time. The processor 210 may output a preview image resulting from the image stabilization for each frame while reducing the strength of image stabilization. For example, a state of gradually reducing the strength of stabilization may be mentioned or referred to as a 'third mode' in one or more embodiments of this document.

In operation 580, in an embodiment, the processor 210 may determine whether the strength of stabilization is lower than a reference value. The processor 210 may determine whether the strength of stabilization is lower than a reference value. The processor 210 may gradually reduce the strength of stabilization until the strength of image stabilization is reduced to the reference value.

In an embodiment, the processor 210 may perform operation 590 if the strength of stabilization is lower than the reference value but, otherwise, perform operation 570. In operation 590, in an embodiment, the processor 210 may output a preview image of obtained image data on the display 110. If the strength of image stabilization is reduced to the reference value in response to a zoom unlock trigger event (e.g., the second trigger event), the processor 210 may display a preview image obtained by performing image stabilization corresponding to the reference value on the display 110.

Figure 6:
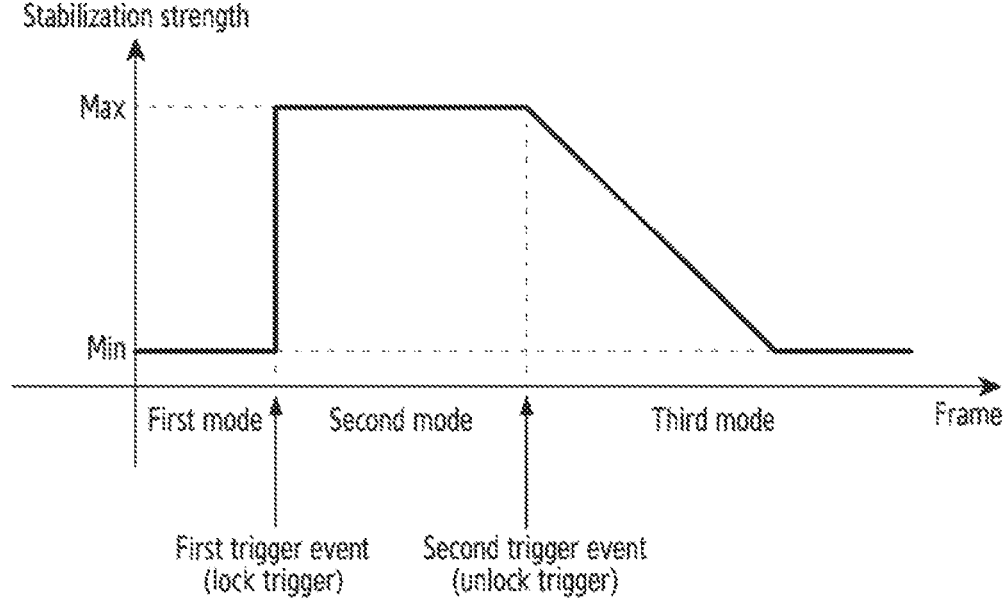
FIG. 6 illustrates a graph in which the strength of image stabilization changes depending on whether a trigger event related to image stabilization occurs in an electronic device In an embodiment.

FIG. 6 illustrates a graph in which the strength of image stabilization changes depending on whether a trigger event related to the image stabilization occurs in an electronic device. In FIG. 6, the graph illustrates the strength of image stabilization described in FIG. 5. The strength of image stabilization, a first trigger event, and a second trigger event illustrated in FIG. 6 are the same as those in FIG. 5.

In an embodiment, if a first trigger event occurs, the processor 210 may increase the strength of image stabilization to a maximum value. The first trigger event may be mentioned or referred to as a 'lock trigger.' The processor 210 may maintain the strength of image stabilization at a minimum level until the first trigger event occurs and increase the strength of image stabilization to a maximum level in response to the first trigger event, thereby outputting a preview image in which the shaking is minimized.

In an embodiment, if a second trigger event occurs, the processor 210 may reduce the strength of image stabilization to a minimum value. The second trigger event may be mentioned or referred to as an 'unlock trigger.'

Figure 7:
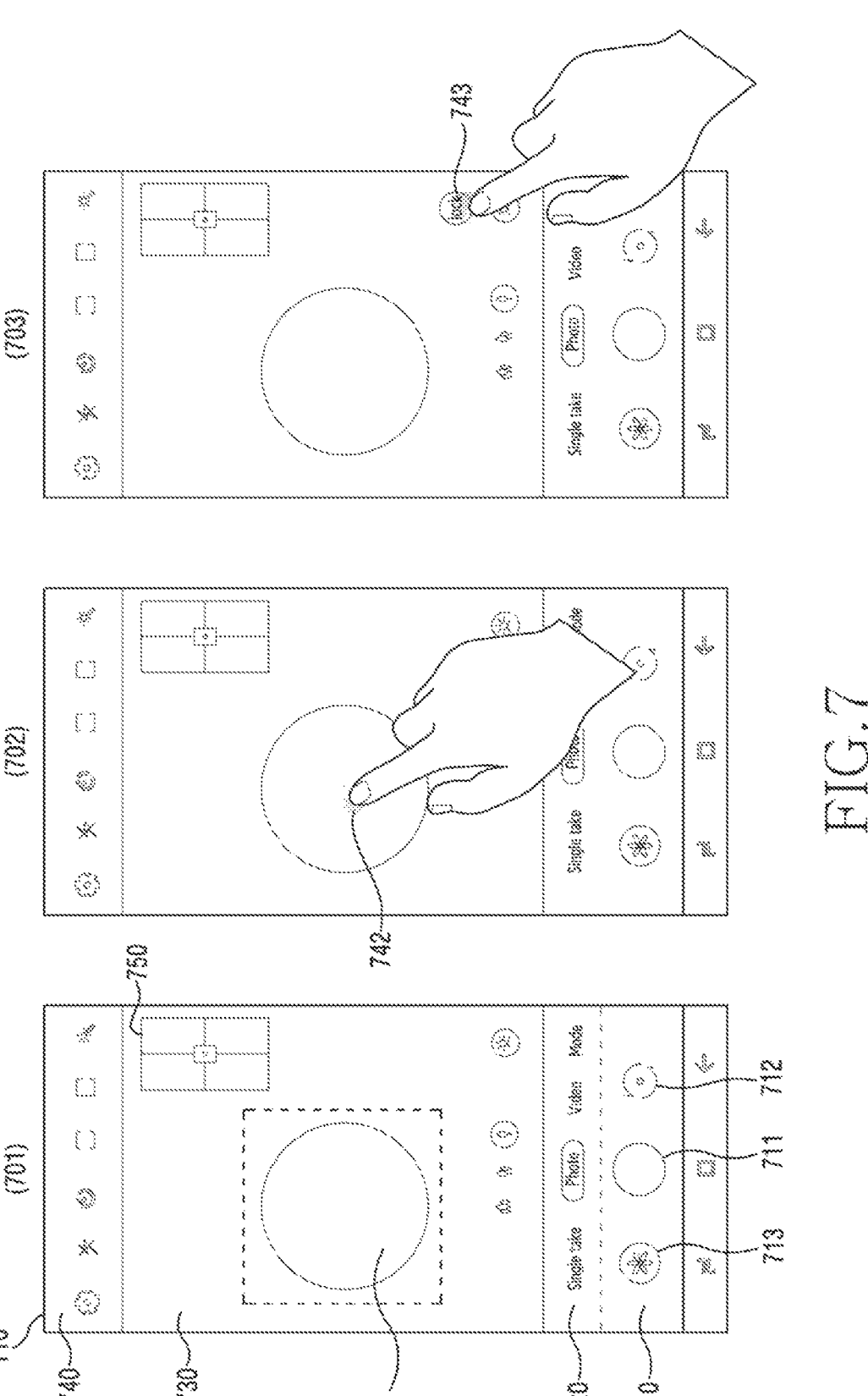
FIG. 7 illustrates a user interface related to a trigger event of increasing the strength of image stabilization in an electronic device In an embodiment.

FIG. 7 illustrates a user interface related to a trigger event of increasing the strength of image stabilization in an electronic device. In FIG. 7, when executing an application, the processor 210 may output a user interface, such as a screen 701, to the display 110 of the electronic device 100.

In an embodiment, the user interface of the application may include a first area 710 in which a photographing icon 711, a camera switching icon 712, a recent image icon 713 are disposed. In an embodiment, the icons may be replaced with terms such as buttons, menus, objects, or the like. In addition, the icons shown in the first area 710 in FIG. 7 are exemplary, and four or more icons may be disposed, or some icons may be replaced by others or omitted.

In an embodiment, the user interface may include a second area 720 showing various photographing modes supported by the application, such as a photo taking, a video recording, a slow motion recording, and/or the currently selected photographing mode. The user may change the photographing mode through a specified input. For example, although the screen 701 shows the photo taking mode, if a user's input of sliding the display 110 from the right to the left is detected, the processor 210 may change the photographing mode to the video recording mode. The electronic device 100 may support three or more photographing modes, and various photographing modes may be switched through a user's input and displayed in the second area 720 as described above.

In an embodiment, the user interface may include a third area 730 displaying an image that is photographed, such as a preview image. However, a preview image or a real-time captured image may be output over another area, as well as over the third area 730. For example, if the electronic device 100 starts recording a video, the items displayed in the second area 720 or a fourth area 740 may not be required to be exposed to the user until the recording ends, so the real-time captured image may be output to the area including the second area 720 or the fourth area 740 in addition to the third area 730. In addition, the real-time captured image may be extended to the first area 710. Some icons may remain to be displayed so as to be superimposed on the real-time captured image.

In an embodiment, the user interface may include a fourth area 740 in which setting menus capable of configuring the settings, the flash, or the aspect ratio are displayed. Parameters included in configuration information may be configured via the fourth area 740. For example, the user may configure a resolution, a frame rate, a filter, or an aspect ratio of a video to be recorded by selecting setting icons included in the fourth area or selecting an aspect ratio icon.

In an embodiment, the processor 210 may display a user interface 750 showing the area to be cropped on the display 110. The user interface 750 may be mentioned or referred to as a 'zoom map.' In an embodiment, the processor 210 may display the zoom map on the display 110 for specific zoom magnifications. For example, the processor 210 may not display the zoom map for a first zoom magnification (e.g., a zoom magnification of ×1 times) but, if a zoom input greater than or equal to a second zoom magnification (e.g., a zoom magnification of ×10 times) is obtained, the zoom map is on the display 110.

In an embodiment, the processor 210 may display the zoom map, based on an optical zoom input and a digital zoom input. For example, if a user's input for zoom-in is obtained after obtaining image data of a specific zoom magnification through an optical zoom, the processor 210 may crop at least a portion of the image of the specific zoom magnification. The processor 210 may provide information about the ratio of the area of which at least the portion is cropped to the image data of the specific zoom magnification through the zoom map. For example, if the ratio is 1:10, the processor 210 may display the zoom map as; cropped area:zoom map area=1:10.

In an embodiment, the processor 210 may adjust the size of the cropped area displayed on the zoom map, based on a zoom magnification. For example, in a case of a first magnification (e.g., a maximum zoom magnification), the processor 210 may display the cropped area on the zoom map, which has a first size (e.g., a minimum size). In a case of a magnification (e.g., a second magnification) less than the first magnification (e.g., a maximum zoom magnification), the processor 210 may display the cropped area on the zoom map, which has a size (e.g., a second size) greater than the first size (e.g., a minimum size).

In an embodiment, although FIG. 7 illustrates that an object shown in the preview image is displayed on the zoom map, the processor 210 may display the cropped area on the zoom map and may not display the object.

Although it is illustrated in the embodiment of FIG. 7 that the first area 710, the second area 720, the third area 730, and the fourth area 740 remain in the screens 701, 702, and 703. Some areas may be omitted or modified before/after starting photographing, during the switching operation of the camera or other similar operations.

Figure 8:
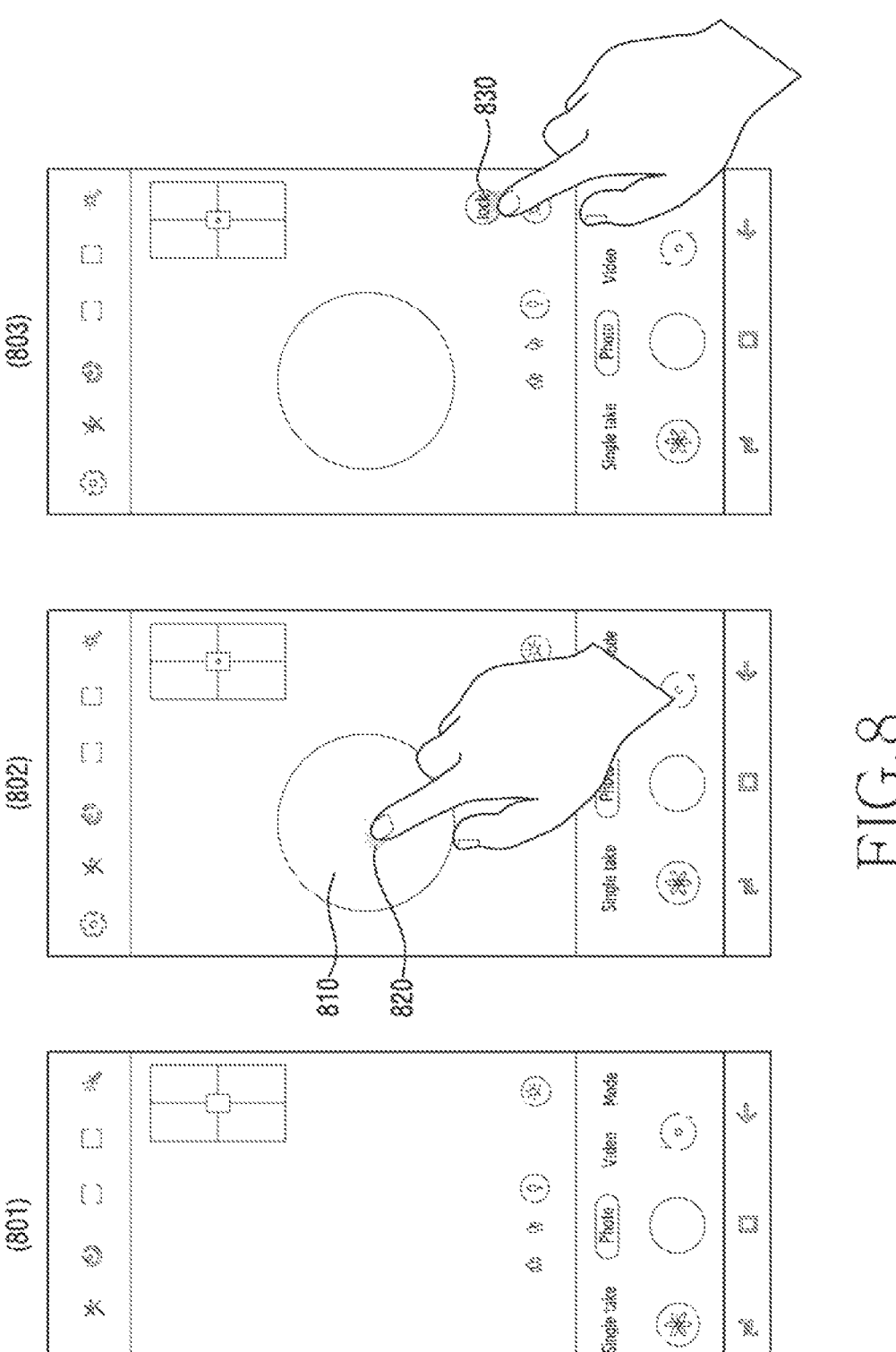
FIG. 8 illustrates a user interface related to a trigger event of lowering the strength of image stabilization in an electronic device In an embodiment.
Figure 12:
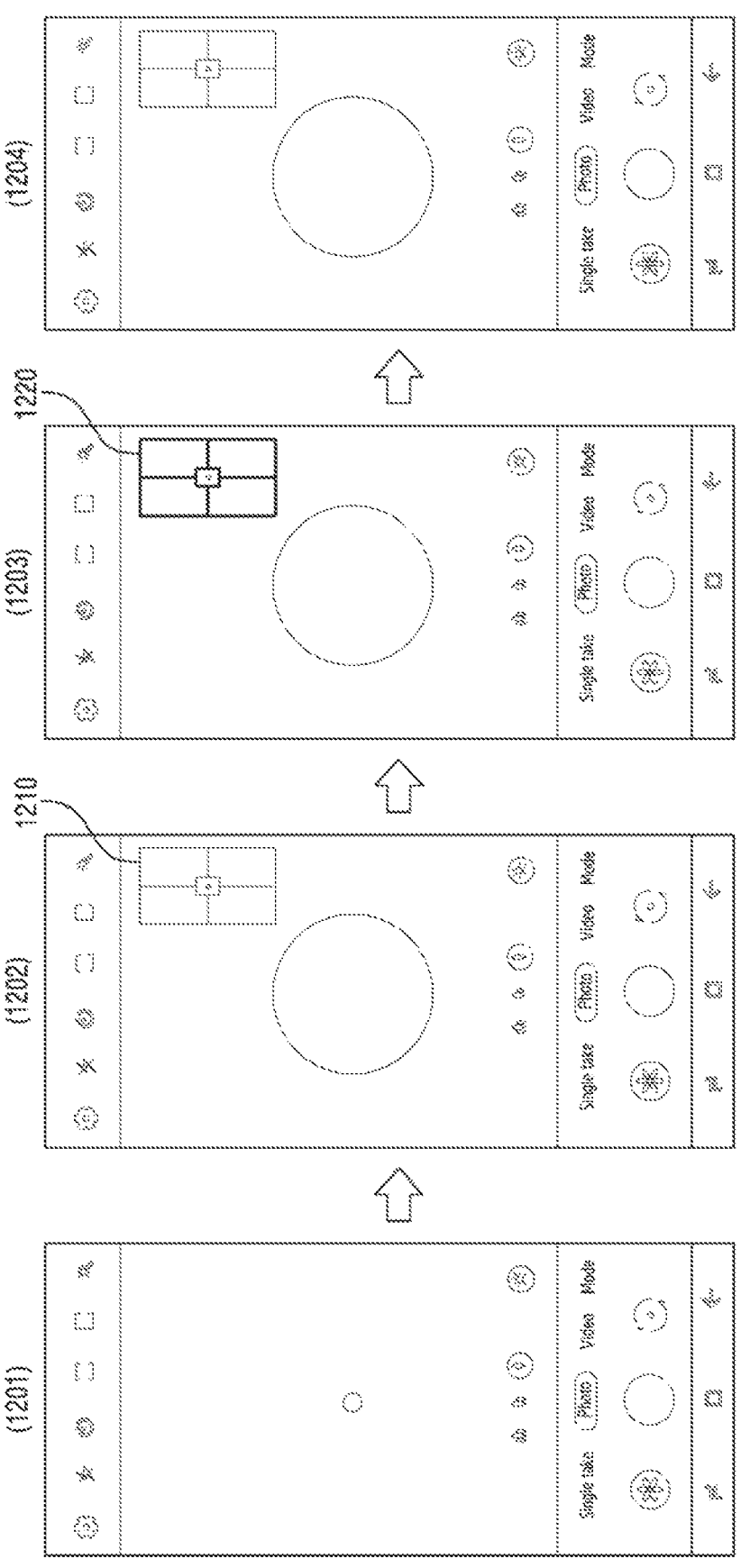
FIG. 12 illustrates that a display varies on a display as a trigger event related to image stabilization occurs in an electronic device In an embodiment.

In an embodiment, the above descriptions of the first area 710, the second area 720, the third area 730, the fourth area 740, and the user interface 750 may be equally applied to the screens 801, 802, and 803 in the embodiment of FIG. 8 and the screens 1201, 1202, 1203, and 1204 in the embodiment of FIG. 12.

In an embodiment, the screen 701 may be a screen in which an object 741 is detected in a case where the zoom magnification is increased to a specific zoom magnification or more in the photo taking mode after a camera application is executed. For example, the screen 701 may be a screen in which an object (e.g., the moon) 741 is detected in a state in which a zoom-in operation is performed with a specific magnification (e.g., zoom magnification of ×20) or more by a user's input after the photo taking mode is executed.

If the object 741 is detected, the processor 210 may display an area of interest around the object 741 to indicate that the object 741 has been detected. Displaying the area of interest may be used in common with displaying the AF. The processor 210 may increase the strength of image stabilization in response to detecting the object 741.

In an embodiment, the screen 702 may indicate obtaining a user's input 742 for selecting an object 741 shown in the preview image. The processor 210 may increase the strength of image stabilization in response to obtaining the user's input 742.

In an embodiment, the screen 703 may indicate obtaining a user's input 743 for selecting an item (e.g., an icon of lock and/or a padlock icon) that enables an execution of an image stabilization function from the third area 730 of the display 110. The processor 210 may increase the strength of image stabilization in response to obtaining the user's input 743 of selecting the item.

FIG. 8 illustrates a user interface related to a trigger event of lowering the strength of image stabilization in an electronic device. In an embodiment, a screen 801 may indicate a case where an object 810 (detected in a photo taking mode) is not detected from a preview image after a camera application is executed. If no object 810 is detected in the preview image, the processor 210 may determine that the object 810 is not to be photographed, thereby reducing the strength of image stabilization.

If a condition, in which the object 810 detected in the preview image falls outside thereof to a certain extent or more, is satisfied, the processor 210 may determine that the object 810 is not to be photographed, thereby reducing the strength of image stabilization. For example, if the object 810 falls outside of the preview image for a first time, the processor 210 may reduce the strength of image stabilization. For example, if the object 810 leaves the preview image at a first speed, the processor 210 may determine that the user is not photographing the object, thereby reducing the strength of image stabilization.

In an embodiment, a screen 802 may indicate obtaining a user's input 820 for selecting the object 810 shown in the preview image. In response to obtaining the user's input 820 in a state in which the strength of image stabilization is increased, the processor 210 may reduce the strength of image stabilization.

In an embodiment, a screen 803 may indicate obtaining a user's input 830 for selecting an item (e.g., an icon of lock and/or a padlock icon) that enables an execution of an image stabilization function from the third area (e.g., the third area 730 in FIG. 7) of the display 110. In response to obtaining the user's input 830 for selecting the item in the state in which the strength of image stabilization is increased, the processor 210 may reduce the strength of image stabilization.

In an embodiment, the item that enables the execution of the image stabilization function (e.g., an icon of lock and/or a padlock icon) (hereinafter, a zoom lock icon) is not limited to the illustrated example and may be changed variously. For example, when switching from the first mode to the second mode, the text displayed on the zoom lock icon may vary. For example, it may be displayed as unlock in the first mode and/or the third mode, and displayed as lock in the second mode. In addition, if the image stabilization function is executed, a color change indicating that the function is activated may be displayed. For example, a dark color (e.g., gray) related to an inactive state may be displayed in the first mode and/or the third mode, and a bright color (e.g., white or yellow) related to an active state may be displayed in the second mode.

Figure 9:
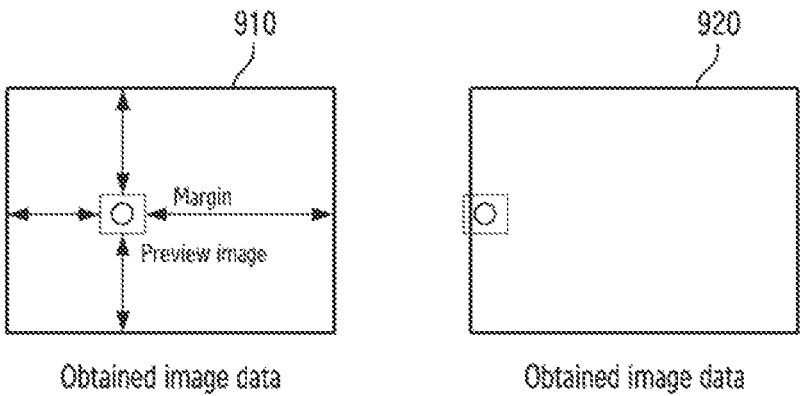
FIG. 9 illustrates a margin area in an electronic device In an embodiment.

FIG. 9 illustrates a margin area in an electronic device. The processor 210 may obtain image data through the camera 220. The processor 210 may output a preview image based on the image data on the display 110. The processor 210 may crop the obtained image data in response to a user's input and the processor 210 may output cropped image data, as a preview image, to the display 110. As shown in FIG. 9, the processor 210 may compare the difference in the area between raw image data obtained by the camera and the preview image. The processor 210 may determine the produced difference in the area as a margin area.

In FIG. 9, a first case 910 may indicate that a preview image area is included in the obtained image data so that a margin area is secured. In contrast, a second case 920 may indicate the case where a preview image falls outside of the obtained image data so that there is no margin area for stabilization, which is a case where an unlock trigger event occurs. If the second case 920 occurs, the processor 210 may operate in the third mode in which the strength of image stabilization is reduced.

Figure 10:
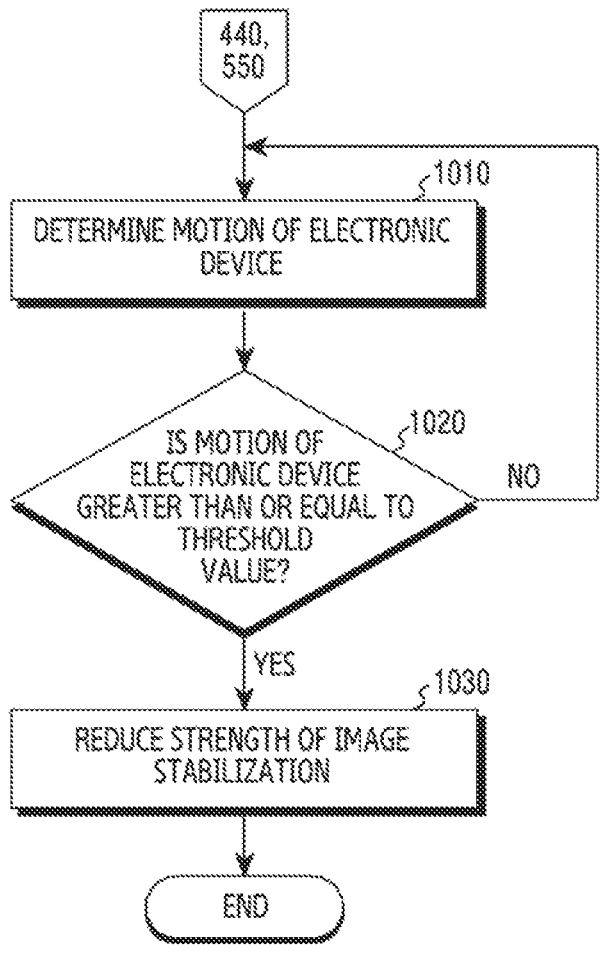
FIG. 10 illustrates an operation of changing the strength of image stabilization by determining motion of an electronic device In an embodiment.

FIG. 10 illustrates an operation of changing the strength of image stabilization by determining a motion of an electronic device. In the following embodiments, respective operations may be performed sequentially, but not necessarily sequentially. For example, the sequence of the respective operations may vary, and at least two operations may be performed in parallel. An operational entity of the flowchart shown in FIG. 10 may be a processor (e.g., the processor 210 in FIG. 2) or an image signal processor (e.g., the image signal processor 240 in FIG. 2).

In operation 1010, in an embodiment, the processor 210 may determine the motion of the electronic device 100. The processor 210 may analyze the motion of the electronic device 100 to determine whether a speed of the motion greater than or equal to a threshold speed is detected. The processor 210 may determine the motion of the electronic device 100 using at least one or more sensors (e.g., a motion sensor).

In an embodiment, the electronic device 100 may include at least one or more of an acceleration sensor, a gyro sensor, and a geomagnetic sensor. The processor 210 may measure azimuth, pitch, and roll values of the electronic device 100 based on the motion's data obtained from at least one sensor, thereby determining the motion of the electronic device 100. The motion data may include 3-axis motion data (x1, y1, z1) obtained from the acceleration sensor or 9-axis motion data obtained by using the gyro sensor and/or the geomagnetic sensor.

In an embodiment, the processor 210 may form a virtual coordinate space based on the measured azimuth (e.g., yaw, pitch, and/or roll values-) in the 9-axis motion data. The processor 210 may specify one area of the virtual coordinate space as a landscape range and specify another area as a portrait range. For example, if a state of the electronic device 100 is included in the landscape range, the processor 210 may determine that the electronic device 100 is in a landscape state in which the parallel long side of the electronic device 100 is supported in the horizontal axis that is parallel to the ground. For example, if the state of the electronic device 100 is included in the portrait range, the processor 210 may determine that the electronic device 100 is in a portrait state in which the parallel long side of the electronic device 100 is supported in the vertical axis that is perpendicular to the ground.

In an embodiment, the processor 210 may determine the motion of the electronic device 100 to recognize the user's intention for photographing. For example, if the motion of the electronic device 100 changes rapidly, it may be determined that the user wishes to change the object to be photographed or stop photographing, thereby reducing the strength of image stabilization.

In operation 1020, in an embodiment, the processor 210 may determine whether a speed of the motion of the electronic device 100 is greater than or equal to a threshold value (e.g., a threshold speed). For example, if the electronic device 100 moves by a first angle (or more) during N frames about a panning axis of the camera 220, the processor 210 may determine that the motion is greater than or equal to a threshold value, thereby performing operation 1030. The first angle may vary depending on the zoom magnification configured for the current frame and/or the size of an object. In an embodiment, the processor 210 may perform operation 1010 if the motion of the electronic device 100 is not greater than or equal to the threshold value (e.g., a threshold speed).

In operation 1030, in an embodiment, the processor 210 may reduce the strength of image stabilization. Operation 1030 may correspond to operations 570 to 590 in FIG. 5.

Figure 11:
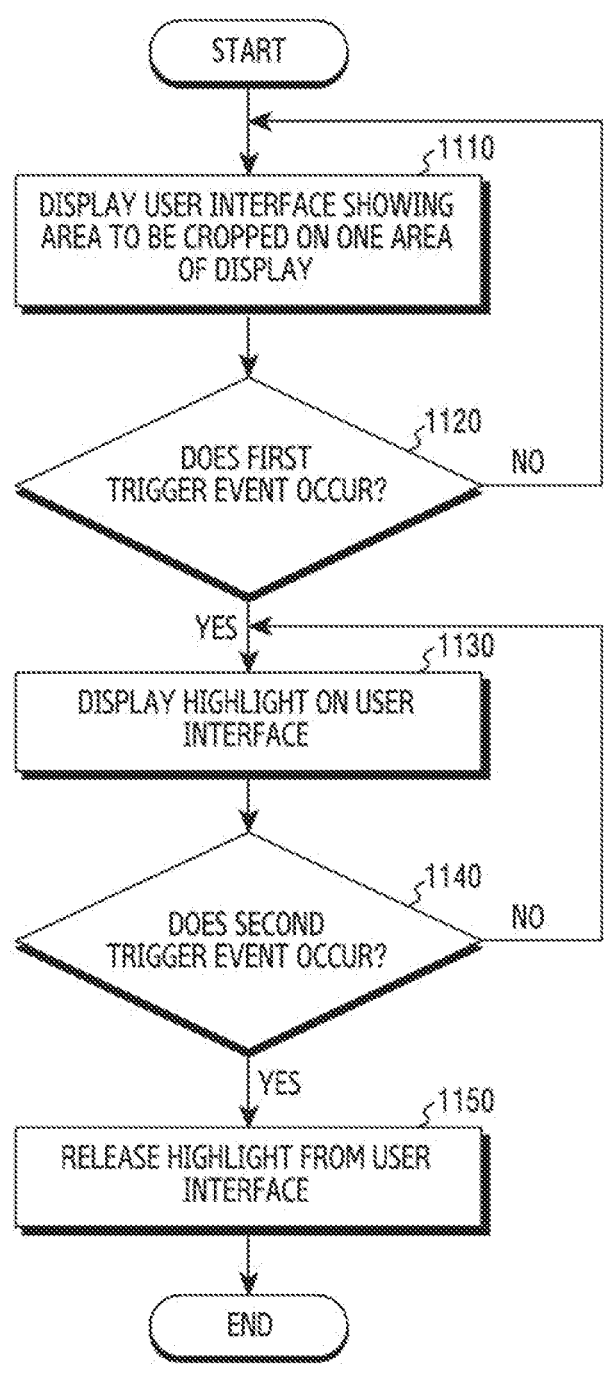
FIG. 11 illustrates an operation of controlling a display when a trigger event related to image stabilization occurs in an electronic device In an embodiment.

FIG. 11 illustrates an operation of controlling a display when a trigger event related to the image stabilization occurs in an electronic device. The operational entity of the flowchart shown in FIG. 11 may be a processor (e.g., the processor 210 in FIG. 2) or an image signal processor (e.g., the image signal processor 240 in FIG. 2). FIG. 11 is related to the screens shown in FIG. 12 (below).

In operation 1110, in an embodiment, the processor 210 may display, on one area (e.g., the third area 730 in FIG. 7) of the display 110, a user interface showing the area to be cropped. If a zoom input is obtained from the user, the processor 210 may display a user interface showing the area to be cropped from obtained raw image data on one area of the display 110. For example, if a zoom input of ×100 times is obtained from the user, the processor 210 may display image data obtained by the camera 220 and image data cropped to $\frac{1}{100}$ of the image data on the display 110.

In operation 1120, in an embodiment, the processor 210 may determine whether a first trigger event occurs. Operation 1120 may correspond to operation 530 in FIG. 5. In an embodiment, the processor 210 may perform operation 1130 if the first trigger event occurs and, otherwise, the processor 210 may perform operation 1110.

In operation 1130, in an embodiment, the processor 210 may display a highlight on the user interface. The processor 210 may display the highlight on the user interface in response to the occurrence of the first trigger event. The processor 210 may display the highlight on the user interface, thereby providing a notification indicating an increase in the strength of image stabilization to the user.

In operation 1140, in an embodiment, the processor 210 may determine whether a second trigger event occurs. Operation 1140 may correspond to operation 560 in FIG. 5. In an embodiment, the processor 210 may perform operation 1150 if the second trigger event occurs and, otherwise, the processor 210 may perform operation 1130.

In operation 1150, in an embodiment, the processor 210 may release the highlight display from the user interface. The processor 210 may release the highlight display from the user interface in response to the occurrence of the second trigger event. The processor 210 may release the highlight display, thereby providing a notification indicating a reduction in the strength of image stabilization to the user.

FIG. 12 illustrates that a display varies on the display as a trigger event related to the image stabilization occurs in an electronic device. FIG. 12 shows a user interface output on the display 110 in relation to the description of FIG. 11.

A screen 1201, in an embodiment, may be a screen in which a preview image is output on the display 110, basically based on a configured magnification (e.g., a magnification of ×1.0 time). For example, the processor 210 may output a preview image including an object (e.g., the moon) at a zoom magnification of ×1.0, on the display 110.

A screen 1202, in an embodiment, may be a screen corresponding to operation 1110 in FIG. 11. The screen 1202 may be a screen in which the processor 210, in response to obtaining a zoom input (e.g., ×100 times) from the user in the state of the screen 1201, outputs a preview image corresponding to the zoom input. If a zoom input is obtained from the user, the processor 210 may display a user interface 1210 showing the area to be cropped from obtained raw image data on one area of the display 110.

A screen 1203, in an embodiment, may correspond to operation 1130 in FIG. 11. In the screen 1203, the processor 210 may display a highlight 1220 on the user interface 1210 showing the area to be cropped. For example, the processor 210 may display at least the outer line of the user interface 1210 in yellow and bold type.

In an embodiment, a specific icon may be displayed on one area (e.g., the third area 730 in FIG. 7) of the display 110 in addition to the highlighting method shown in the screen 1203. For example, if a first trigger event occurs while photographing with a high magnification (e.g., zoom magnification of ×10 times or higher), the processor 210 may display a lock icon indicating that the preview is locked up without shaking.

In an embodiment, a current mode (e.g., a lock mode) may be displayed on one area (e.g., the second area 720 in FIG. 7) of the display 110 in addition to the highlighting method shown in the screen 1203. For example, if a first trigger event occurs while photographing with a high magnification (e.g., zoom magnification of ×100 times) in the photo mode, the processor 210 may change the display of the photo mode into a display of a lock mode in one area (e.g., the second area 720 in FIG. 7) of the display 110.

A screen 1204, in an embodiment, may corresponding to operation 1150 in FIG. 11. The processor 210 may release the highlight and output the preview image on the screen 1202.

FIG. 13 illustrates an electronic device 1301 in a network environment 1300 according to one or more embodiments. In FIG. 13, the electronic device 1301 in the network environment 1300 may communicate with an electronic device 1302 via a first network 1398 (e.g., a short-range wireless communication network), or at least one of an electronic device 1304 or a server 1308 via a second network 1399 (e.g., a long-range wireless communication network). In an embodiment, the electronic device 1301 may communicate with the electronic device 1304 via the server 1308. In an embodiment, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a Subscriber Identification Module (SIM) 1396, or an antenna module 1397. In some embodiments, at least one of the components (e.g., the connecting terminal 1378) may be omitted from the electronic device 1301, or one or more other components may be added in the electronic device 1301. In some embodiments, some of the components (e.g., the sensor module 1376, the camera module 1380, or the antenna module 1397) may be implemented as a single component (e.g., the display module 1360).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may store a command or data received from another component (e.g., the sensor module 1376 or the communication module 1390) in volatile memory 1332, process the command or the data stored in the volatile memory 1332, and store resulting data in non-volatile memory 1334. In an embodiment, the processor 1320 may include a main processor 1321 (e.g., a Central Processing Unit (CPU) or an Application Processor (AP)), or an auxiliary processor 1323 (e.g., a Graphics Processing Unit (GPU), a Neural Processing Unit (NPU), an Image Signal Processor (ISP), a sensor hub processor, or a Communication Processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display module 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application).

In an embodiment, the auxiliary processor 1323 (e.g., an image signal processor or a communication processor) may be implemented as part of another component (e.g., the camera module 1380 or the communication module 1390) functionally related to the auxiliary processor 1323. In an embodiment, the auxiliary processor 1323 (e.g., the neural processing unit) may include a hardware structure specified for AI model processing. An AI model may be generated by machine learning. Such learning may be performed, e.g., by the electronic device 1301 where the AI is performed or via a separate server (e.g., the server 1308).

Learning algorithms may include, but are not limited to, e.g., supervised learning, unsupervised learning, semi-supervised learning, or reinforcement learning. The AI model may include a plurality of artificial neural network layers. The artificial neural network may be a Deep Neural Network (DNN), a Convolutional Neural Network (CNN), a Recurrent Neural Network (RNN), a Restricted Boltzmann Machine (RBM), a Deep Belief Network (DBN), a Bidirectional Recurrent Deep Neural Network (BRDNN), deep Q-network or a combination of two or more thereof but is not limited thereto. The AI model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related to the data. The memory 1330 may include the volatile memory 1332 or the non-volatile memory 1334.

The program 1340 may be stored in the memory 1330 as software, and may include, for example, an Operating System (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output sound signals to the outside of the electronic device 1301. The sound output module 1355 may include, for example, a speaker or a receiver. The speaker may be used for general purposes, such as playing multimedia or playing record. The receiver may be used for receiving incoming calls. In an embodiment, the receiver may be implemented as separate from, or as part of the speaker.

The display module 1360 may visually provide information to the outside (e.g., a user) of the electronic device 1301. The display module 1360 may include, for example, a display, a hologram device, or a projector and control circuitry to control a corresponding one of the display, hologram device, and projector. In an embodiment, the display module 1360 may include a touch sensor adapted to detect a touch, or a pressure sensor adapted to measure the intensity of force incurred by the touch.

The audio module 1370 may convert a sound into an electrical signal and vice versa. In an embodiment, the audio module 1370 may obtain the sound via the input module 1350, or output the sound via the sound output module 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. In an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. In an embodiment, the interface 1377 may include, for example, a High Definition Multimedia Interface (HDMI), a Universal Serial Bus (USB) interface, a Secure Digital (SD) card interface, or an audio interface.

A connecting terminal 1378 may include a connector via which the electronic device 1301 may be physically connected with the external electronic device (e.g., the electronic device 1302). In an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. In an embodiment, the haptic module 1379 may include, for example, a motor, a piezoelectric element, or an electric stimulator.

The camera module 1380 may capture a still image or moving images. In an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. In an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. In an embodiment, the communication module 1390 may include a wireless communication module 1392 (e.g., a cellular communication module, a short-range wireless communication module, or a Global Navigation Satellite System (GNSS) communication module) or a wired communication module 1394 (e.g., a Local Area Network (LAN) communication module or a Power Line Communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., LAN or Wide Area Network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., International Mobile Subscriber Identity (IMSI)) stored in the SIM 1396.

The wireless communication module 1392 may support a 5G network, after a 4G network, and next-generation communication technology, e.g., New Radio (NR) access technology. The NR access technology may support enhanced Mobile Broadband (eMBB), massive Machine Type Communications (mMTC), or Ultra-Reliable and Low-Latency Communications (URLLC). The wireless communication module 1392 may support a high-frequency band (e.g., the mmWave band) to achieve, e.g., a high data transmission rate. The wireless communication module 1392 may support various technologies for securing performance on a high-frequency band, such as, e.g., beamforming, massive Multiple-Input and Multiple-Output (massive MIMO), full dimensional MIMO (FD-MIMO), array antenna, analog beam-forming, or large scale antenna. The wireless communication module 1392 may support various requirements specified in the electronic device 1301, an external electronic device (e.g., the electronic device 1304), or a network system (e.g., the second network 1399). In an embodiment, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of lms or less) for implementing URLLC.

The antenna module 1397 may transmit or receive a signal or power to or from the outside (e.g., the external electronic device) of the electronic device 1301. In an embodiment, the antenna module 1397 may include an antenna including a radiating element composed of a conductive material or a conductive pattern formed in or on a substrate (e.g., a Printed Circuit Board (PCB)). In an embodiment, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. In an embodiment, another component (e.g., a radio frequency integrated circuit (RFIC)) other than the radiating element may be additionally formed as part of the antenna module 1397.

According to one or more embodiments, the antenna module 1397 may form a mmWave antenna module. In an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, General Purpose Input and Output (GPIO), Serial Peripheral Interface (SPI), or Mobile Industry Processor Interface (MIPI)).

In an embodiment, commands or data may be transmitted or received between the electronic device 1301 and the external electronic device 1304 via the server 1308 coupled with the second network 1399. Each of the electronic devices 1302 or 1304 may be a device of a same type as, or a different type, from the electronic device 1301. In an embodiment, all or some of operations to be executed at the electronic device 1301 may be executed at one or more of the external electronic devices 1302, 1304, or 1308.

For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example.

The electronic device 1301 may provide ultra low-latency services using, e.g., distributed computing or mobile edge computing. In another embodiment, the external electronic device 1304 may include an internet-of-things (IoT) device. The server 1308 may be an intelligent server using machine learning and/or a neural network. In an embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. In an embodiment of the disclosure, the electronic devices are not limited to those described above.

One or more embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, in an embodiment, the module may be implemented in a form of an Application-Specific Integrated Circuit (ASIC).

One or more embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

Figure 14:
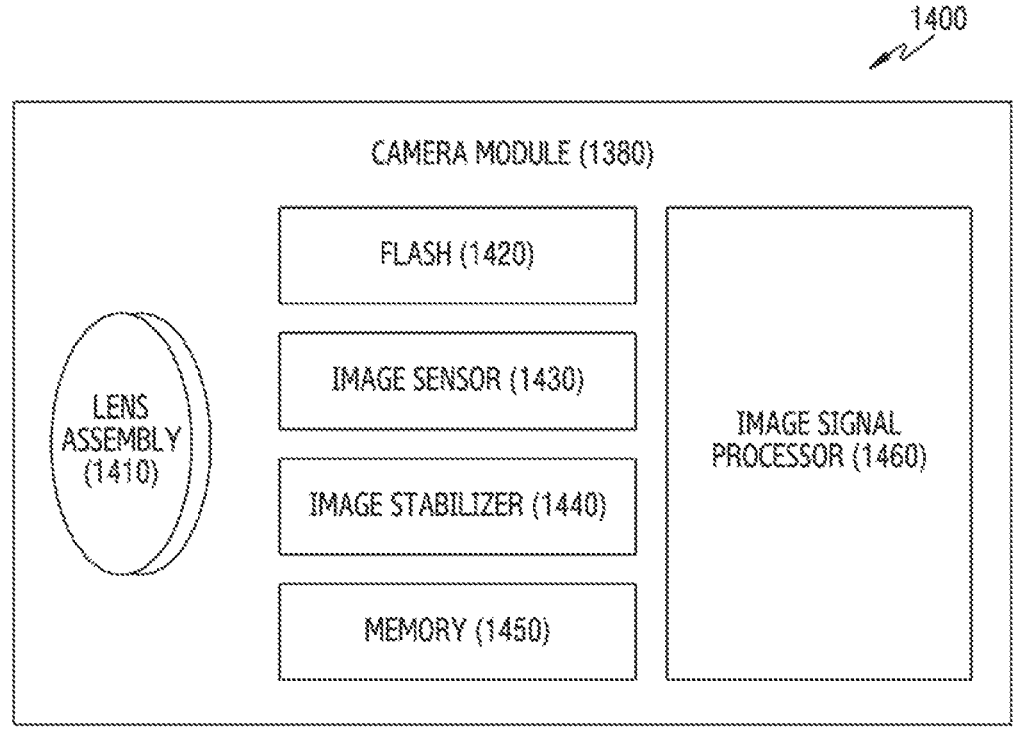
FIG. 14 illustrates a camera module according to one or more embodiments.

FIG. 14 is a block diagram 1400 illustrating the camera module 1380 according to one or more embodiments. In FIG. 14, the camera module 1380 may include a lens assembly 1410, a flash 1420, an image sensor 1430, an image stabilizer 1440, memory 1450 (e.g., buffer memory), or an image signal processor 1460. The lens assembly 1410 may collect light emitted or reflected from an object whose image is to be taken. The lens assembly 1410 may include one or more lenses. In an embodiment, the camera module 1380 may include a plurality of lens assemblies 1410. In such a case, the camera module 1380 may form, for example, a dual camera, a 360-degree camera, or a spherical camera. Some of the plurality of lens assemblies 1410 may have the same lens attribute (e.g., view angle, focal length, auto-focusing, f number, or optical zoom), or at least one lens assembly may have one or more lens attributes different from those of another lens assembly. The lens assembly 1410 may include, for example, a wide-angle lens or a telephoto lens.

The flash 1420 may emit light that is used to reinforce light reflected from an object. In an embodiment, the flash 1420 may include one or more light emitting diodes (LEDs) (e.g., a red-green-blue (RGB) LED, a white LED, an infrared (IR) LED, or an ultraviolet (UV) LED) or a xenon lamp. The image sensor 1430 may obtain an image corresponding to an object by converting light emitted or reflected from the object and transmitted via the lens assembly 1410 into an electrical signal. In an embodiment, the image sensor 1430 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1430 may be implemented using, for example, a Charged Coupled Device (CCD) sensor or a Complementary Metal Oxide Semiconductor (CMOS) sensor.

The image stabilizer 1440 may move the image sensor 1430 or at least one lens included in the lens assembly 1410 in a particular direction, or control an operational attribute (e.g., adjust the read-out timing) of the image sensor 1430 in response to the movement of the camera module 1380 or the electronic device 1301 including the camera module 1380. This allows compensating for at least part of a negative effect (e.g., image blurring) by the movement on an image being captured. In an embodiment, the image stabilizer 1440 may sense such a movement by the camera module 1380 or the electronic device 1301 using a gyro sensor or an acceleration sensor disposed inside or outside the camera module 1380.

In an embodiment, the image stabilizer 1440 may be implemented, for example, as an optical image stabilizer. The memory 1450 may store, at least temporarily, at least part of an image obtained via the image sensor 1430 for a subsequent image processing task. For example, if image capturing is delayed due to shutter lag or multiple images are quickly captured, a raw image obtained (e.g., a Bayer-patterned image, a high-resolution image) may be stored in the memory 1450, and its corresponding copy image (e.g., a low-resolution image) may be previewed via the display module 1360. Thereafter, if a specified condition is met (e.g., by a user's input or system command), at least part of the raw image stored in the memory 1450 may be obtained and processed, for example, by the image signal processor 1460. In an embodiment, the memory 1450 may be configured as at least part of the memory 1330 or as a separate memory that is operated independently from the memory 1330.

The image signal processor 1460 may perform one or more image processing with respect to an image obtained via the image sensor 1430 or an image stored in the memory 1450. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening).

Additionally or alternatively, the image signal processor 1460 may perform control (e.g., exposure time control or read-out timing control) with respect to at least one (e.g., the image sensor 1430) of the components included in the camera module 1380. An image processed by the image signal processor 1460 may be stored back in the memory 1450 for further processing, or may be provided to an external component (e.g., the memory 1330, the display module 1360, the electronic device 1302, the electronic device 1304, or the server 1308) outside the camera module 1380. In an embodiment, the image signal processor 1460 may be configured as at least part of the processor 1320, or as a separate processor that is operated independently from the processor 1320. If the image signal processor 1460 is configured as a separate processor from the processor 1320, at least one image processed by the image signal processor 1460 may be displayed, by the processor 1320, via the display module 1360 as it is or after being further processed.

In an embodiment, the electronic device 1301 may include a plurality of camera modules 1380 having different attributes or functions. In such a case, at least one of the plurality of camera modules 1380 may form, for example, a wide-angle camera and at least another of the plurality of camera modules 1380 may form a telephoto camera. Similarly, at least one of the plurality of camera modules 1380 may form, for example, a front camera and at least another of the plurality of camera modules 1380 may form a rear camera.

In an embodiment, an electronic device 100 may include a camera 220, a display 110, and at least one processor (e.g., the processor 210 in FIG. 2 and/or the image signal processor 240 in FIG. 2) electrically connected to the camera 220 and the display 110.

In an embodiment, the at least one processor may obtain image data by driving the camera 220 and output a preview image for the image data on the display 110, based on a configured magnification. The at least one processor may detect at least one object included in the preview image obtained by the camera 220 in a state in which the configured magnification is greater than a reference magnification and stabilize the preview image, based on whether the at least one object is detected.

In an embodiment, the at least one processor may increase the strength of image stabilization by changing a parameter for performing the image stabilization in response to the detection of the at least one object.

In an embodiment, the at least one processor may increase the strength of image stabilization in response to maintenance of a state in which the at least one object is detected within a specified area in the preview image for a predetermined time.

In an embodiment, the at least one processor may reduce the strength of image stabilization if a trigger event for reducing the strength of image stabilization occurs.

In an embodiment, the at least one processor may gradually lower the strength of image stabilization in response to the trigger event.

In an embodiment, the at least one processor may determine a margin area for image stabilization in response to a user's zoom input.

In an embodiment, the margin area may be an area obtained by excluding a second area included in the preview image from a first area included in the image data.

In an embodiment, the at least one processor may determine motion of the electronic device using at least one sensor and, if the motion is greater than or equal to a threshold value, reduce the strength of image stabilization.

In an embodiment, the trigger event may include at least one of receiving a user's input for stopping the image stabilization, the case where the at least one object is not included in the image data, or the case where a preview area falls outside of the margin area.

In an embodiment, the at least one processor may increase the strength of image stabilization by increasing a coefficient of a low-pass filter included in a path for obtaining the image data from an image sensor (e.g., the image sensor 1430 in FIG. 14) of the camera 220.

In an embodiment, an operation method of an electronic device 100 may include obtaining image data by driving a camera 220, outputting a preview image of the image data through a display 110, based on a configured magnification, detecting at least one object included in the preview image obtained by the camera 220 in the state in which the configured magnification is greater than a reference magnification, and performing image stabilization on the preview image, based on whether the at least one object is detected.

In an embodiment, the operation method of the electronic device 100 may include increasing the strength of image stabilization by changing a parameter for performing the image stabilization in response to the detection of the at least one object.

In an embodiment, the operation method of the electronic device 100 may include increasing the strength of image stabilization in response to maintenance of a state in which the at least one object is detected within a specified area in the preview image for a predetermined time.

In an embodiment, the operation method of the electronic device 100 may include gradually reducing the strength of image stabilization if a trigger event for reducing the strength of image stabilization occurs. The trigger event may include at least one of receiving a user's input for stopping the image stabilization, the case where the at least one object is not included in the image data, or the case where a preview area falls outside of a margin area.

In an embodiment, the operation method of the electronic device 100 may gradually reduce, if the trigger event occurs, the strength of image stabilization to a reference value for a predetermined time in response to the trigger event.

In an embodiment, an electronic device 100 may include a camera 220, a display 110, and at least one processor (e.g., the processor 210 in FIG. 2 and/or the image signal processor 240 in FIG. 2) electrically connected to the camera 220 and the display 110. The at least one processor may obtain image data by driving the camera 220, determine a margin area for image stabilization in response to a user's zoom input, and output a preview image for the image data, based on a configured magnification, on the display 110. The at least one processor may increase the strength of image stabilization in response to a first trigger event for increasing the strength of image stabilization in the state in which the configured magnification is greater than a reference magnification. If a second trigger event for reducing the strength of image stabilization occurs in the state in which the strength of image stabilization is increased, the at least one processor may reduce the strength of image stabilization in response to the second trigger event.

In an embodiment, the first trigger event may include detecting at least one object, and the at least one processor may increase the strength of image stabilization in response to maintenance of a state in which the at least one object is detected within a specified area in the preview image for a predetermined time.

In an embodiment, the at least one processor may gradually reduce the strength of image stabilization to a reference value for a predetermined time in response to the second trigger event.

In an embodiment, the first trigger event may include at least one of receiving a user's input for increasing the strength of image stabilization or the case where at least one object is included in the image data.

In an embodiment, the second trigger event may include at least one of receiving a user's input for stopping the image stabilization, the case where the at least one object is not included in the image data, or the case where a preview area falls outside of the margin area.

What is claimed is:

1. An electronic device comprising:
   a camera;
   a display;
   memory storing instructions; and
   at least one processor operatively or electrically connected with the camera, the display, and the memory;
   wherein the instructions are executed by the at least one processor to cause the electronic device to:
      obtain image data from the camera;
      output a preview image of the image data on the display, based on a configured magnification;
      detect at least one object of the preview image in a state in which the configured magnification is greater than a reference magnification;
      perform image stabilization on the preview image, based on the detected at least one object of the preview image; and
      in a case that a trigger event for reducing a strength of the image stabilization occurs, gradually reduce the strength of the image stabilization to a reference value for a predetermined time in response to the trigger event.

2. The electronic device of claim 1, wherein the at least one processor is further configured to increase the strength of the image stabilization by changing a parameter for performing the image stabilization in response to the detection of the at least one object of the preview image.

3. The electronic device of claim 2, wherein the at least one processor is further configured to increase the strength of the image stabilization in response to a determination that the at least one object is detected within a specified area of the preview image for the predetermined time.

4. The electronic device of claim 1, wherein the at least one processor is further configured to determine a margin area for the image stabilization in response to a user's input.

5. The electronic device of claim 4, wherein the margin area is an area obtained by excluding a second area included in the preview image from a first area included in the image data.

6. The electronic device of claim 1, wherein the at least one processor is further configured to determine a motion of the electronic device using at least one sensor, and
   wherein, in a case that the motion is greater than or equal to a threshold value, the at least one processor is further configured to reduce the strength of the image stabilization.

7. The electronic device of claim 1, wherein the trigger event comprises at least one of receiving a user's input for stopping the image stabilization, in a first case where the at least one object is not included in the image data, or in a second case where a preview area falls outside of a margin area.

8. The electronic device of claim 1, wherein the at least one processor is further configured to increase the strength of the image stabilization by increasing a coefficient of a low-pass filter disposed in a path for obtaining the image data from the camera.

9. A method of operating an electronic device, the method comprising:
   obtaining image data from a camera;

outputting a preview image of the image data on a display, based on a configured magnification;

detecting at least one object of the preview image obtained by the camera in a state in which the configured magnification is greater than a reference magnification; performing image stabilization on the preview image, based on the detected at least one object of the preview image; and in a case that a trigger event for reducing a strength of the image stabilization occurs, gradually reducing the strength of the image stabilization to a reference value for a predetermined time in response to the trigger event.

10. The method of claim 9, further comprising increasing the strength of the image stabilization by changing a parameter for performing the image stabilization in response to the detection of the at least one object.

11. The method of claim 10, further comprising increasing the strength of the image stabilization in response to a determination that the at least one object is detected within a specified area in the preview image for a for the predetermined time.

12. The method of claim 9, wherein the trigger event comprises at least one of receiving a user's input for stopping the image stabilization, in a case where the at least one object is not included in the image data, or in a case where a preview area falls outside of a margin area.

\*　\*　\*　\*　\*